(12) United States Patent
Rakshani et al.

(10) Patent No.: US 8,171,323 B2
(45) Date of Patent: May 1, 2012

(54) INTEGRATED CIRCUIT WITH MODULAR DYNAMIC POWER OPTIMIZATION ARCHITECTURE

(75) Inventors: Vafa James Rakshani, Newport Coast, CA (US); Musaravakkam Samaram Krishnan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 799 days.

(21) Appl. No.: 12/166,065

(22) Filed: Jul. 1, 2008

(65) Prior Publication Data

US 2010/0005328 A1 Jan. 7, 2010

(51) Int. Cl.
*G06F 1/00* (2006.01)
*G06F 1/32* (2006.01)

(52) U.S. Cl. ........ 713/323; 713/300; 713/320; 713/322; 713/324

(58) Field of Classification Search .................. 713/300, 713/320, 322–324, 500, 600; 714/1, 4.11, 714/10, 11, 13
See application file for complete search history.

(56) References Cited

U.S. PATENT DOCUMENTS

| | | | |
|---|---|---|---|
| 6,947,865 | B1 | 9/2005 | Mimberg et al. |
| 6,990,594 | B2 | 1/2006 | Kim |
| 7,043,649 | B2 | 5/2006 | Terrell |
| 2002/0021163 | A1* | 2/2002 | Manning ....................... 327/534 |
| 2002/0165622 | A1* | 11/2002 | Fujii ............................... 700/22 |
| 2004/0117678 | A1* | 6/2004 | Soltis et al. .................. 713/320 |
| 2005/0107967 | A1* | 5/2005 | Patel et al. ...................... 702/64 |
| 2005/0253462 | A1* | 11/2005 | Falkowski et al. .............. 307/43 |
| 2006/0220726 | A1* | 10/2006 | Ward et al. ................... 327/534 |
| 2006/0294399 | A1* | 12/2006 | Chen et al. .................... 713/300 |
| 2007/0234083 | A1* | 10/2007 | Lee ............................... 713/300 |
| 2007/0250721 | A1* | 10/2007 | Searles et al. ................. 713/300 |
| 2010/0097128 | A1* | 4/2010 | Sumita ......................... 327/537 |
| 2010/0250974 | A1* | 9/2010 | Ristic et al. ................... 713/300 |

OTHER PUBLICATIONS

Strasser, M. et al. "Micromachined CMOS Thermoelectric Generators as On-Chip Power Supply". 2003. IEEE. The 12$^{th}$ International Conference on Solid State Sensors, Acutators, and Microsystems. Boston. Jun. 8-12, 2003. pp. 45-48.*
Mathuna, Sean et al. "Magnetics on Silicon: An Enabling Technology for power Supply on Chip". May 2005. IEEE. IEEE Transactions on Power Electronics. vol. 20, No. 3. pp. 585-592.*
"The Free On-Line Dictionary of Computing". Entry 'redundancy'. Online May 9, 1995. Retrieved from Internet Sep. 8, 2011. <http://foldoc.org/redundancy>.*
U.S. Appl. No. 11/073,229, filed Aug. 18, 2005, Krishnan.

* cited by examiner

*Primary Examiner* — Thomas J Cleary
(74) *Attorney, Agent, or Firm* — Sterne, Kessler, Goldstein & Fox P.L.L.C.

(57) ABSTRACT

A system and method for regulating power consumption within an integrated circuit (IC) with a modular design. The IC is designed so that any one distinct functional module within the IC utilizes only transistors with a substantially same or similar critical voltage level, which may for example be the threshold voltage of the transistors. Consequently, the supply voltage delivered to each functional modules can be lowered to the minimum voltage necessary to enable the transistors within the module to operate. Similarly, modules within the IC may be designed with transistors which share a common value for a substrate bias voltage or a clock speed, or with a combination of common values for several electrical factors. In this way, it is possible to reduce power consumption by fine-tuning the voltages supplied to (or clock speeds driving) specific modules, in a way which is custom-tuned to each module.

22 Claims, 10 Drawing Sheets

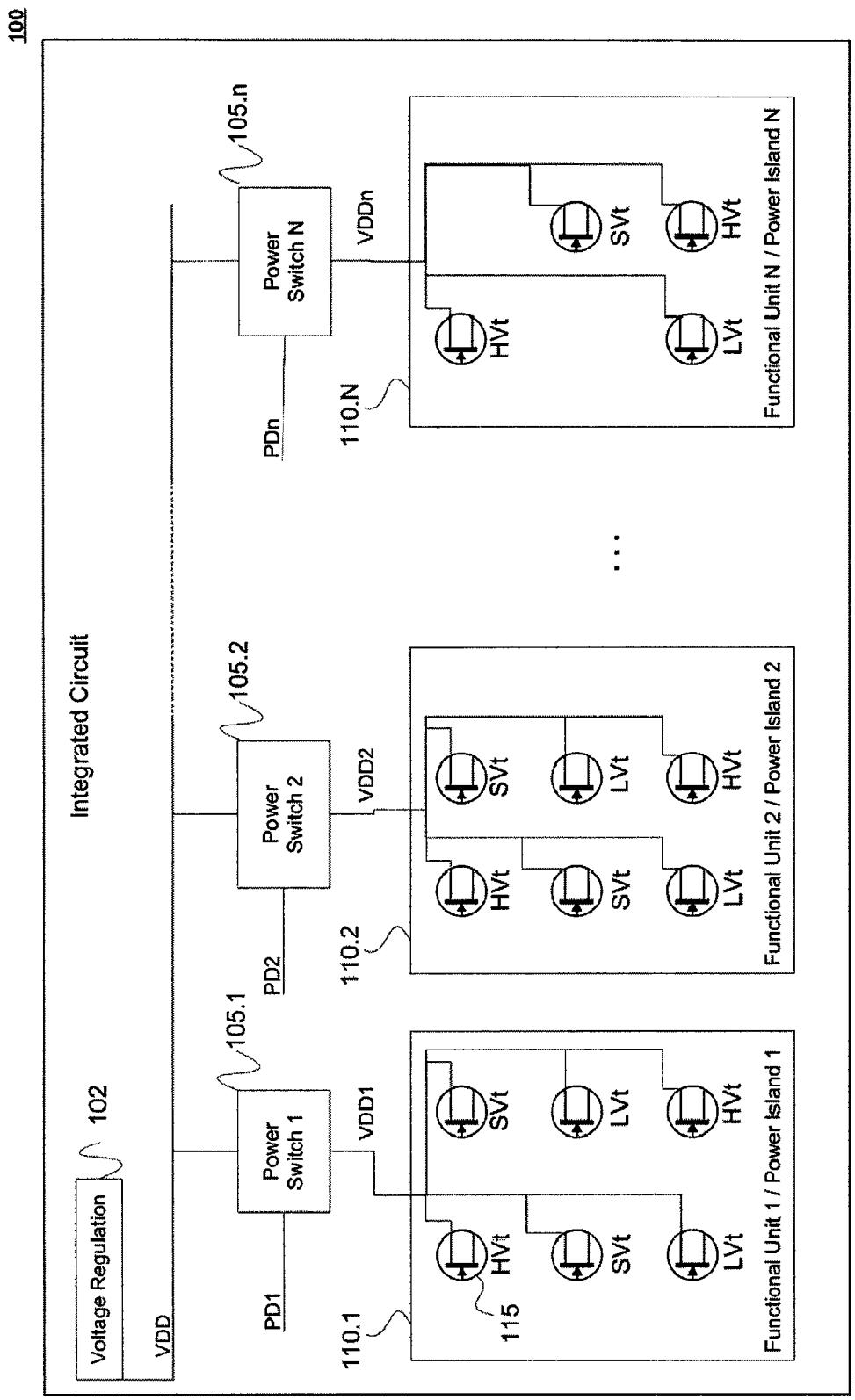
FIG. 1 (conventional)

INTEGRATED CIRCUIT WITH MODULAR DYNAMIC POWER OPTIMIZATION ARCHITECTURE

BACKGROUND OF THE INVENTION

1. Field of the Invention

The present invention pertains to the field of power management in a semiconductor environment. More particularly, the invention pertains to a system and method for adaptive scaling of voltages, clock speeds, and other electrical factors within an integrated circuit in order to dynamically minimize power consumption while maintaining optimum performance.

2. Background Art

For virtually all electronics applications, it is desirable to minimize power consumption. In terms of system design and performance, reduced power consumption results in less heat being generated. This increases system life, reduces requirements for cooling systems. A reduction in power supply requirements also enables smaller, more compact design. Further, any reduction in the power consumed by a circuit component, such as an integrated circuit (IC) or a module within an IC, will improve the performance and reliability of prior circuit stages which feed into the IC or IC module. Further, for portable devices such as laptop computers, media players, and cell phones, reduced power consumption contributes to longer battery life and also enables additional functionality for a given power supply. From a societal standpoint, even incremental reductions in power consumption contribute to conservation of energy resources.

There are a number of conventional strategies for reducing power consumption within integrated circuits. One strategy is to identify a module(s) within an IC which has not drawn power for some determined period of time, or which is not anticipated to draw power for some future period of time (or both), and to either reduce or shut off the power supply to the module. If the module is fed by a single power supply, then this strategy may only be viable if no components or submodules within the module are expected to require power during this period of time. If any submodule or component within the module is expected to require power, it may be necessary to maintain a supply of power to the entire module. (In some cases, the "module" may constitute the entire IC as a whole.)

Another conventional power reduction strategy is to reduce the power supplied to the IC or to a module within the IC. In virtually all cases, this will result in some kind of reduction in system performance, for example lower clock speeds for digital chips or reduced range for a radio frequency (RF) chip. Depending on the application for which the IC is being used, or depending on the particular function of a module within an IC, in some cases the reduction in system performance will have no noticeable impact from a user perspective. For example, a user using a portable computer for word processing may not notice a reduction in the clock speed of the system microprocessor. Clearly, however, for some applications—such as popular video applications or voice-to-text translation, to name just two of many examples—it is desirable to maintain maximum performance from an IC, for example, to maintain maximum clock speed from a microprocessor or a Digital Signal Processor (DSP) chip. For these applications, any attempts at power savings through reduced supply voltages may have a notable impact, and sometimes an unacceptable impact, on system performance in relation to the requirements of the user application.

What is needed, then, is a system and method for providing on-chip power management for an integrated circuit, where the system and method minimize any negative impact on system performance, and where the system and method take better advantage of the variable levels of voltages or clock speeds which may be required by transistors and other elements within the IC package.

BRIEF SUMMARY OF THE INVENTION

The present invention meets the above-identified needs by providing a system and method for regulating power consumption within an integrated circuit (IC). In one exemplary embodiment, CMOS transistors are employed, where the CMOS transistors have two or more different threshold voltages, for example, a first threshold voltage and a second threshold voltage. The IC is designed so that any one or more distinct functional modules within the IC utilize only CMOS transistors with a single threshold voltage (for example, only a low threshold voltage or only a high threshold voltage). Consequently, the supply voltage delivered to the distinct functional modules can be lowered to the minimum voltage necessary to enable the transistors within those module to operate.

Similarly, modules within the IC may be designed with transistors which share a common source for a substrate bias voltage or a clock speed, or with a combination of common values for several electrical factors (supply voltage, substrate bias voltage, clock speed, etc.). In this way, it is possible to reduce power consumption by fine-tuning the voltages supplied to (or clock speeds driving) specific modules in a way which is custom-tuned to each module.

BRIEF DESCRIPTION OF THE DRAWINGS/FIGURES

The features and advantages of the present invention will become more apparent from the detailed description set forth below when taken in conjunction with the drawings in which like reference numbers indicate identical or functionally similar elements. The left-most digit of a reference number identifies the drawing in which the reference number first appears (for example, an element labeled 310 typically first appears in the drawing labeled FIG. 3).

Additionally, some elements are identified by a number followed by a period, which is then followed by a second number (for example, 215.1, 215.2, 215.3, . . . , 215.$n$). In these cases, the number to the left of the period (for example, "215") identifies a generic class or generic version of an element, while the number to the right of the period (for example, "1", "2", "3", . . . , "n") may identify a specific instance of the element, where the specific instance may have a further distinguishing feature or characteristic in addition to the generic qualities.

FIG. 1 is a block diagram of an exemplary integrated circuit (IC).

DETAILED DESCRIPTION OF THE INVENTION

Figure 2:
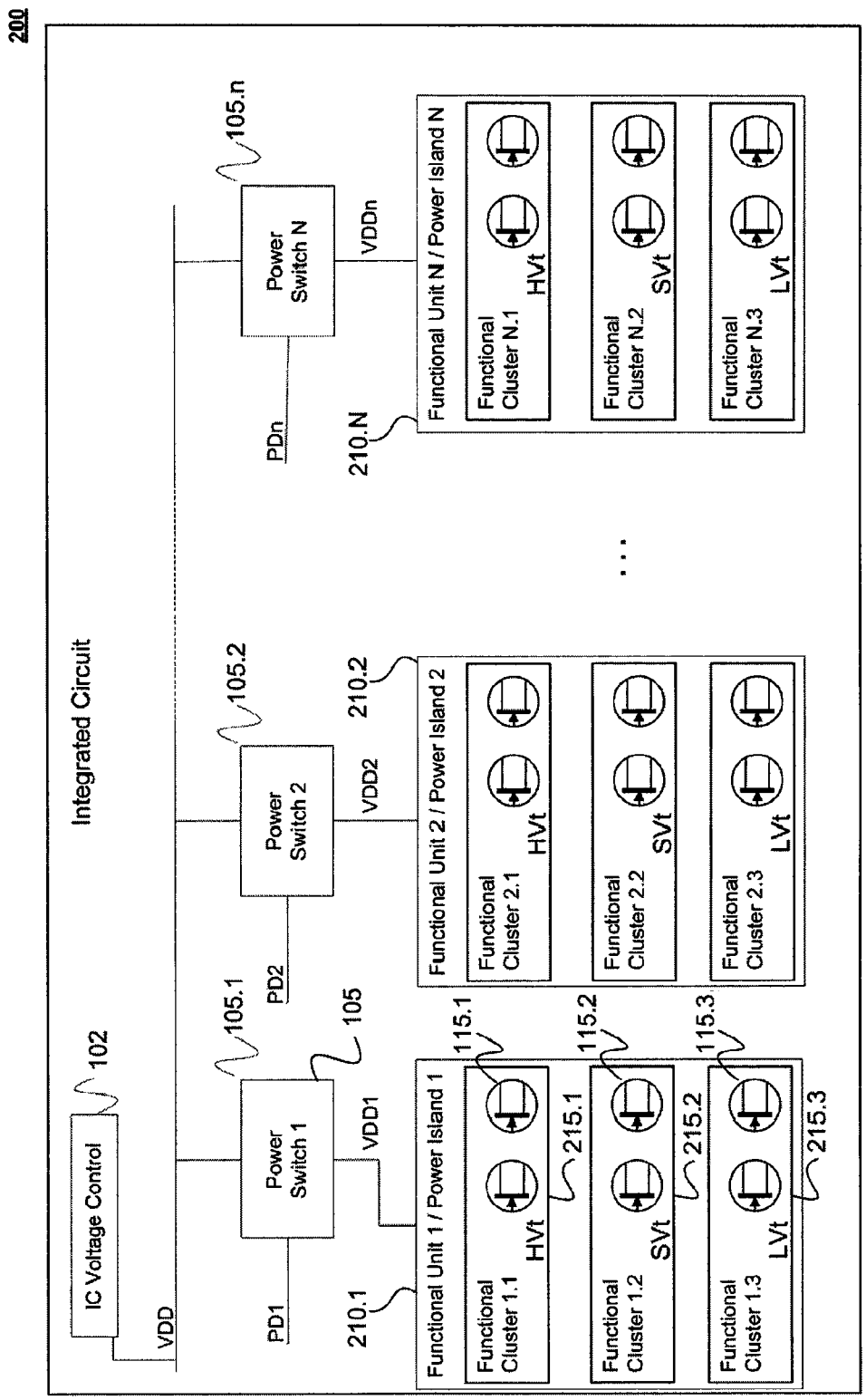
FIG. 2 is a block diagram of an exemplary IC according to the present system and method.

1. Introduction
2. Definitions
3. Exemplary Integrated Circuit (Conventional)
4. Overview of the Present System and Method
5. Exemplary Integrated Circuit (IC) According to the Present System and Method
6. Another Exemplary IC
7. Another Exemplary IC
8. Another Exemplary IC
9. An Exemplary Method for Designing an IC
10. Exemplary Method for Real Time Dynamic Power Minimization for an IC
11. Alternative Embodiments
12. Conclusion

1. Introduction

The present invention is directed to systems and methods for using a modular organization of electrical components within an integrated circuit (IC) to minimize IC power consumption while maintaining substantially optimal performance by the IC.

Some systems or methods may be defined or characterized here in whole or in part by exemplary instances of such systems or methods (for example, by an IC with a particular organization of modules and submodules, or a particular organization or type of electrical components such as transistors, or by a method with a particular set of steps). It should be understood, however, that such systems or methods may encompass other specific instances or embodiments not specifically described herein.

2. Definitions

Functional unit—An integrated circuit (IC) may perform just a single function, for example by serving as a flip-flop or an adder. Typically, however, an IC employing large scale integration (LSI) or very large scale integrated (VLSI) may perform multiple functions on a single chip. A module comprising a group of components (for example, transistors, resistors, capacitors, diodes, and/or inductors) on an IC which perform a defined function may be regarded as a "functional unit". A functional unit may typically, though not necessarily, have a specific set of inputs and outputs, and a well-defined interface (an electrical interface, a logical interface, and/or other interfaces) with other functional units of the IC, or with external components, or both.

There may be repeated instances of a single function (for example, multiple flip-flops or adders on a single chip), or there may be two or more different types of functional units which together provide the IC with its overall functionality. For example, a microprocessor may have such functional units as an arithmetic/logic unit(s) (ALU), a floating point unit(s) (FPU), a load/store unit(s), a branch prediction unit(s), a memory controller(s), and other such modules. Each of these modules within the IC may be regarded as a distinct functional unit, and some such units may be further subdivided into component functional units. At a higher level, a microprocessor as a whole may be viewed as a functional unit of an IC, for example if the microprocessor shares the IC die with at least one other functional unit, for example, a cache memory unit.

Some other possible functional units may include, for example and without limitation, a general purpose processor, a mathematical processor, a state machine, a digital signal processor, a video processor, an audio processor, a logic unit, a logic element, a multiplexer, a demultiplexer, a switching unit, a switching element, an input/output (I/O) element, a peripheral controller, a bus, a bus control, a register, a combinatorial logic element, a storage unit, a programmable logic device, a memory unit, a neural network, a sensing circuit, a control circuit, a digital to analog converter, an analog to digital converter, an oscillator, a memory, a filter, an amplifier, a mixer, a modulator, or a demodulator.

Persons skilled in the relevant arts will recognize that there are many other well-known types of functional units which may be employed as part of electronic modules implemented in an IC, and the list provided above is only a representative sampling of such functional units. Any such functional units, and possibly others yet to be developed, may conceivably serve as elements of the present system and method, and benefit from the power management techniques of the present system and method, as described below.

A functional unit may occupy a specific, localized area of an IC die, with a well defined geometric boundary on the die. However, a functional unit may also be distributed over the die, with two or more localized, coupled sets of components which together provide the functionality of the functional unit.

Functional cluster—A functional cluster as defined in this document is similar to a functional unit.

Specifically, a "functional cluster" is a module or group of components (for example, transistors, resistors, capacitors, diodes, and/or inductors) on an IC which perform a defined function. Those functions may possibly include but are not limited to those functions enumerated immediately above in conjunction with the definition of "functional unit". However, a "functional cluster" is specifically farther defined by including some class of components (for example, a class of transistors) that have at least one similar electrical characteristic and behave similarly in response to such electrical factors as supply voltage, current, clock speed, or substrate bias voltage.

For example, in a functional cluster, all the transistors may have a same or substantially similar threshold voltage. Or, for another example, in a functional cluster, all the transistors may have a same or substantially similar input impedance, or a same or substantially similar maximum clock speed or minimum clock speed corresponding to supply voltages. The elements which have the same or substantially the same electrical response to an electrical input factor may be referred to as an "electrical property class". This term is discussed further below.

A functional cluster is defined both by its functionality and by the common or similar attribute of a designated class of its electrical components, such as its transistors. As mentioned in the previous paragraph, these attributes are generally characterized by the response of these components to specific inputs such as supply voltage and clock frequency. A functional cluster may exclude components which do not share the same or the substantially similar defining electrical behavior. In other words, a functional cluster may be comprised of components of a first functional class, while excluding components of a second functional class.

For example, if a functional cluster is designed with transistors with a high "switching threshold" (threshold) voltage, the functional cluster may not include any transistors with a standard threshold voltage or low threshold voltage. Similarly, if a functional cluster is designed with transistors with a low threshold voltage, the functional cluster must not include any transistors with a standard threshold voltage or a high threshold voltage.

However, in some cases, a functional cluster may include components from two or more functional classes. In this event, however, the voltage requirements of the cluster, the power requirements of the cluster, the clock speed requirements of the cluster, or other power-related requirements of the cluster may still be determined wholly or primarily by the components of a single functional class of components within the cluster.

As discussed in further detail below, reduced power consumption may be achieved in an IC by deliberately designing at least some of the functional units to be functional clusters as well.

Module—The term "module" may be used generically to refer to functional units and functional clusters of an IC.

Power island—A functional unit, a functional cluster, or a group of several functional units or functional clusters sharing a common, local power source within the IC, and possibly sharing a common, local power supply control element as well, may be referred to as a "power island". Either a functional unit or a functional cluster may be a power island.

Critical voltage level—Behaviors of certain electrical components, such as transistors, diodes, and possibly other components, may be modified by applying specific voltages. For example, a threshold voltage determines the on-state or off-state of a Field Effect Transistor (FET), and typically the applied voltage must exceed a particular, critical threshold voltage level to switch the transistor on. Similarly, a bias voltage may be applied to the substrate of a Metal Oxide Semiconductor FET (MOSFET) in order to modify the leakage current. Other voltage parameters and levels may influence other aspects of transistor behavior.

Moreover, and depending on the context, the term "critical voltage level" may further refer to a particular numeric level, value, or range of values of an applied voltage which may be a threshold value or critical value for some activity of the electrical component. One example of a critical voltage level, then, is a particular level of voltage which may be applied to the gate of a MOSFET, and which is the threshold voltage for the MOSFET.

The term "critical level", as used in this document, is a term which may be applied to any such parameter which is an operating parameter that influences the behavior of a component in general, and which in some contexts influences the behavior of transistors or diodes in particular. The "critical value or range" of a parameter is required to be met in order to ensure that the behavior of the components of a functional unit or cluster meets or exceeds an acceptable, predefined performance level.

The term critical level (or related terms, such as "critical voltage level") may also be used with reference to a functional unit or functional cluster, with substantially the same meaning as for a component. For example, "critical voltage level" may refer to any voltage parameter which is an operating parameter that influences the behavior of the functional unit or cluster, and that is required to be met in order to ensure that the behavior of the functional unit or cluster meets or exceeds an acceptable, predefined performance level.

Regulated voltage—A "regulated voltage", as the term is used in this document, is a voltage supplied to a component, or to a functional module or functional cluster, by a power supply element such as a voltage regulation element of an IC. The operational state of a functional module may be determined at least in part by the value of the regulated voltage in relation to a critical voltage level of the module. A regulated voltage is also referred to as a "supply voltage" or "regulated supply voltage" in this document.

Component class—A "component class" is a type of electrical component.

For example, transistors may be considered one component class, and diodes may be considered a second, different component class. In some cases, a class may be more specific. For example, bipolar junction transistors (BJTs) may be considered one component class, and FETs may be considered a second, different component class.

Electrical property class—An electrical property class distinguishes electronic components which are operationally similar (typically belonging to the same component class), but which have different electrical characteristic with respect to a regulated voltage such as a supply voltage or substrate bias voltage. Or, the components may have different characteristics with respect to some other operating parameter, functional parameter, or structural parameter, such as for example a maximum clock frequency or a transistor gate length. For example, among MOSFETs, a first electrical property class may be MOSFETs with a low threshold voltage (LVt), a second electrical property class may be MOSFETs with a standard threshold voltage (SVt), and a third electrical property class may be MOSFETs with a high threshold voltage (HVt). Or, for example, a first electrical property class may be transistors (MOSFETs, BJTs, or other types of transistors) which, by their structural design, can be switched on and off with a high frequency (where the definition of "high frequency" may depend on an application context); and where a second, different electrical property class may be transistors which, by structural design, are limited to being switched on and off at a lower frequency (where, again, the definition of a "low frequency" may depend on an application context).

An electrical property class will typically be associated with a component class of solid state technologies, and a given component class may typically have several electrical property classes or a range of electrical property classes. For example, metal oxide semiconductor field effect transistors (MOSFETs) may be considered a component class of solid state devices, which may be comprised of several electrical property classes. For another example, junction field effect transistors (JFETs) may be considered another component class of solid state devices, which may be comprised of several electrical property classes. For another example, bipolar junction transistors (BJTs) may be considered another component class of solid state devices, which may be comprised of several electrical property classes.

In some contexts, the term "electrical property class" may refer to other structural aspects, functional aspects, physical aspects or design aspects of components or groups of components. The term "electrical property class" may also be used, in some contexts, to refer to the structural, functional, or design aspects of circuits, in addition to or in the alternative to, the structural, functional or design aspects of individual components. For example, the elements in a functional cluster may be implemented as "custom devices or circuits", where the sizes of these circuits have been customized/modified to suit their operating environment or scope. The circuits sharing a particular customized size (for example, logic gates of a particular size) would belong to a designated "electrical property class" defined by size (for example, a small, medium, or large circuit class). Another example would be circuit elements sharing a designated physical layout. For example, circuits sharing a tiled arrangement (to improve their area utilization or performance) may be designated as belonging to a "tiled electrical property class".

Another example of an electrical property class may be circuits comprised of dynamic logic elements. Yet another example of an electrical property class might be a circuit specifically comprised of a specific component class, such as inductors, or capacitors, or resistors, or diodes, or a limited subset of such components. This would especially be the case if a circuit designed for a given purpose would conventionally include components from multiple component classes, but, for purposes of the present system and method, is custom-designed to include components from a more limited subset of component classes.

The properties referred to herein that define an "electrical property class" include properties that may not be prima facie electrical characteristics, but that ultimately influence electrical characteristics. For example, a tiled component layout, or other specific type of component layout for a module, may be implemented first and foremost with a view to effective or efficient use of limited space on a die or chip. However, it is to the extent that such characteristics influence electrical properties that they fall within the scope of an "electrical property class". For example, if modules are designed for a specific layout (such as tiled layout) which optimizes performance, and if the performance optimization reduces power consumption or in some other way constrains electrical properties of the associated module in desirable ways, then the components which may be combined in the tiled layout constitute an electrical property class.

Operational state (of a functional unit or functional cluster)—The term "operational state", as used in this document, characterizes an overall operational condition or mode of a functional unit/functional cluster. Exemplary operational states may include an "Active" state, wherein a module is operational; a "Sleep" state, where a module is receiving no power or where a regulated voltage (defined above) is insufficient to enable the module to function; a "Standby" state, where a module is partly powered and possibly partly operational, but not fully operational; any of various designated levels of power consumption (which may be associated with such states as Active, Sleep, Standby, or similar states); and any of various clocking or frequency modes, such as a high speed mode or a reduced speed mode. Levels of power consumption may be characterized by specific power values (measured for example, in watts) or related electrical values (voltage and/or current values). Levels of power consumption may also be characterized in operational and/or relative power terms, for example, an "on state", an "on state with reduced power consumption", an "on state with minimal power consumption", an "off state", an "on state with a specified clock frequency", etc. It will be understood that associated specific electrical values (such as the power consumed when a module is in an "on state with reduced power consumption" will be application-specific and design-specific, and may further be defined with reference to other values. For example, a voltage level suitable for a module to be operating at an "on state with reduced power consumption" would typically be a voltage level defined with respect to, and further a voltage level which is less than, a voltage level associated with an "on state" of the same module.

An operational state may sometimes be referred to as an "operational mode" or simply a "mode".

Operational Requirement of the IC—An "operational requirement" of an IC is a function which the IC is required to perform at a specific time or in a specific context. For example, a microprocessor may have an operational requirement at one point in time to retrieve data from memory; an operational requirement at another point in time to retrieve an instruction from memory; an operational requirement at yet another time to execute a previously retrieved instruction; and still another operational requirement at another point in time to store the results of an executed instruction back to memory. At any given point in time, the operational requirement(s) of an IC may determine, in part or in whole, which functional units or functional clusters need to be active in order to support the requirement(s).

Operational Property class—In addition to and independent of the Electrical Property class described above, a functional unit or functional cluster may also be characterized by its behavior in an operational state. Such Operational Properties may include but are not limited to the "Maximum Switching Activity" of all nodes in a given functional unit or functional cluster, which is commonly referred to as "Maximum Toggle Rate". The maximum toggle rate of a functional cluster is an important characteristic that may be used in the design of other components to ensure the reliable operation of the given functional cluster and still reduce its power consumption.

3. Exemplary Integrated Circuit (Conventional)

FIG. 1 is a block diagram of an integrated circuit (IC) 100. IC 100 is comprised of multiple functional units 110, such as functional unit 1, functional unit 2, and possibly other functional units up to functional unit numbered N (labeled in FIG. 1 as 110.1, 110.2, and 110.N, respectively). Each functional unit receives power via a respective power switch 105 which is controlled by a power switch control line PD such as PD1, PD2, or PDn (for power switch 105.1, 105.2, and 105.N, respectively). Each power switch is fed from a power line VDD, which in turn receives power from IC voltage regulation 102. Voltage regulation 102 may provide such services as stepping up or stepping down a voltage from an off-chip or on-chip voltage source (not shown), and voltage filtering to remove voltage spikes. Each power switch 105 provides a respective voltage VDD to its respective functional unit 210 (for example, power switch 105.1 providing voltage VDD1 to functional unit 110.1).

Any one functional unit of functional units 110.1, 110.2, . . . 110.N may provide a same or substantially similar function as any other such unit; alternatively, any one functional unit (for example, functional unit 110.1) may provide a fundamentally different or unique function as compared to one or more other units (for example, as compared to units 110.2, . . . , 110.N). In FIG. 1, for example, functional unit 110.N is shown as having a different arrangement of transistors as compared to functional units 110.1 and 110.2, which may be indicative of a different function for functional unit 110.N as compared with the other functional units.

More particularly, each functional unit 110 may be configured to operate as any one of a variety of different analog or digital modules, well known in the art of electronics, such as those listed above in the section on Definitions and including, for example and without limitation: a general purpose processor, a mathematical processor, a state machine, a digital signal processor, a video processor, an audio processor, a logic unit, a logic element, a multiplexer, a demultiplexer, a switching unit, a switching element, an input/output (I/O) element, a peripheral controller, a bus, a bus control, a register, a combinatorial logic element, a storage unit, a programmable logic device, a neural network, a sensing circuit, a control circuit, a digital to analog converter, an analog to digital converter, an oscillator, a memory, a filter, an amplifier, a mixer, a modulator, or a demodulator.

Each functional unit 110 is comprised of multiple electronic components which are illustrated schematically in FIG. 1 as transistors 115. Persons skilled in the relevant arts will recognize that a functional unit will necessarily comprise other electronic components as well, which may include, for example and without limitation: resistors, capacitors, inductors, diodes, lasers, and optical switching components.

As can be seen from FIG. 1, a typical functional unit 110 may be comprised of transistors 115, which may be mixed types of transistors in terms of their structure, characteristics, and power requirements. For example, each functional unit 110 may be comprised of MOSFET transistors having a variety of threshold voltages. For example, HVt is a high threshold voltage, SVt is a standard threshold voltage and LVt is a low threshold voltage, as described above. Different transistors 115 with different threshold voltages require different voltages in order to be switched on. For example, an HVt transistor requires a higher threshold voltage than an SVt transistor, and an SVt transistor requires a higher threshold voltage than an LVt transistor. Typical example threshold voltages, for an exemplary supply voltage of about 1.2 volts, may be 0.6 volts for an HVt MOSFET, 0.5 volt for an SVt MOSFET, and 0.4 volts for an LVt MOSFET. While not illustrated in FIG. 1, different transistors 115 may be further distinguished by other structural and/or operational parameters as well, such as an optimal substrate bias or gate length or a maximum allowed clock frequency (that is, a maximum frequency at which a transistor may be switched on and off).

Each power switch 105 is controlled by a power switch control line PD, and can be used to determine whether or not power is delivered to a functional unit 110. Using power switch 105, it is possible to turn on the voltage to a functional unit 110 or to turn off the voltage to a functional unit 110. In this way, by switching the voltage to a functional unit on or off, it is possible to reduce the power consumption of IC 100.

However, each functional unit 110 is comprised of transistors 115 with a range of values for a given operational parameters, such as a range of threshold voltages. As a consequence, when a functional unit 110 does require power for operations, it will be necessary to operate the functional unit in a mode which is sufficient for all of its component parameters. For example, for a functional unit 110 comprised of transistors 115 with a range of threshold voltages, it is necessary to provide a supply voltage which is sufficient for the transistors 115 with the highest threshold voltages, such as the transistors labeled HVt in FIG. 1.

Therefore each functional unit 110 necessarily receives the same supply voltage VDD (so, for example, VDD1, VDD2, . . . , VDDn will all be the same voltage). Although not illustrated in FIG. 1, transistors 115 of a functional unit 110 may also be supplied with other common, shared supply values, such as a common substrate bias voltage or a common clock signal. Because all elements receive the common, shared supply values (e.g., voltages, clock speeds, etc.), there is no way to regulate or adjust a supply voltage, a substrate bias voltage, or a clock speed to values which may be optimal for specific, individual transistors 115 within functional unit 110. This limits the degree to which power consumption can be minimized for the functional unit 110.

In summary, power consumption on IC 100 may be regulated by turning off power to functional blocks which are not in use, or in some cases by reducing voltage to some functional blocks which may be in a Standby Mode, as that term is conventionally understood. However, each functional block is comprised of multiple transistors or other components which may vary from each other in their values for various operational parameters. While such components might benefit from component-specific values for supply voltages, clock speeds, or other electrical parameters, such component-specific supplies are not available. This limits or constrains the degree to which power consumption may be tuned, or adjusted at a finer level, to specific values of operational parameters for different transistors or other components.

Although exemplary IC 100 is illustrated as being comprised of MOSFET transistors, the limitations on fine-grained control discussed in this context are pertinent to other kinds of transistors such as, for example, bi-polar junction transistors (BJTs). Although the specific voltage parameters and other parameters pertinent to other kinds of transistors may differ from the parameters which characterize a MOSFET transistor, the underlying design constraints remains the same. For a given type of electronic component (for example, a MOSFET transistor), there can be different classes of that component (such as HVt, SVt, and LVt transistors). As long as different classes of components are combined or integrated within a functional unit 110, all the components in the functional unit will share a common power source (such as a voltage source), which limits the extent to which power consumption for IC 100 may be minimized.

4. Overview of the Present System and Method

An IC is comprised of a set of interconnected module, referred to herein as "functional units" and "functional clusters", where each module performs a specific function. A module may be characterized by its operating parameters such as supply voltage, substrate bias voltage, temperature, properties of the fabrication process, and the associated performance attributes such as instructions/transactions per second, maximum frequency of operation, and other attributes which may influence its power consumption. Each of the above parameters is often specified as a range of values that result in an acceptable operation of the given module.

In an embodiment of the present system and method, by controlling the operating parameters of the individual modules, the top-level system can be configured to perform one or more functions (referred to as applications) with different performance levels and different levels of power consumption for individual modules.

In conventional semiconductor technologies (such as CMOS), the supply voltage and input clock frequency provided to a particular module may be adjusted to ensure that it meets the performance goals needed for a given application. When a given module is not needed for a given application, it may be kept idle or alternatively, placed in a state that minimizes the dynamic power or leakage power consumed by it.

The present system and method improves on the conventional power management approach in multiple respects, which may include but are not limited to:

a) For at least a single module (of multiple modules within the IC), design a module that has devices (for example, transistors) with similar electrical characteristics in relation to a regulated voltage (such as a supply voltage) or other electrical characteristic. Specific examples of such electrical characteristics include, and are not limited to, the device switching threshold voltage, the substrate bias voltage, and the maximum clock frequency of the module. So for example, a module may be engineered such that all transistors in the module have a common switching threshold voltage. Similar design considerations may be applied to more than one module. For example, a first module may have transistors all having a first common switching threshold voltage. A second module may have transistors all having a second common switching threshold voltage. A third module may have transistors with a high threshold voltage and long gate lengths. A fourth module may have a toggle rate of internal circuit nodes that are above a pre-defined value.

b) The ability to dynamically and/or adaptively control the regulated voltage supplied to a selected module independent of other blocks. This control may be implemented as a function of the electrical characteristics of the module as described in (a) above.

c) The ability to dynamically and/or adaptively adjust the clock frequency of one or more modules in accordance with the performance goal requirement for a given application.

d) The ability to dynamically and/or adaptively adjust the substrate bias voltage to one or more modules as a function of the type of devices used in the implementation of the given module.

e) The ability to define and/or modify the sequence to adjust the clock frequency, supply voltage and substrate bias as mentioned in item c through item e) above.

The present system and method may minimize dynamic power or leakage power consumption:

i) If a given module is implemented as a switchable power island, that is, with a regulated supply voltage that can be disconnected from the main power supply, the module can be powered down with its outputs isolated from their destinations in other modules that may be powered.

ii) If a given module is implemented with a variable power supply that can be adjusted (automatically or through system firmware), the power supply to this module can be dynamically adjusted to be adequate for its performance goals during its normal operation. This adjustment will be based on the apriori characterization of the module. A feature of the present system and method is that the range of this adjustment may further benefit from the type of devices used in the implementation of this module. For example, the range of regulated voltage levels supplied for a module implemented with low threshold voltage devices may be different from the range of regulated voltage levels for a module implemented with high threshold voltage devices.

iii) Similar to ii), when the operation of a given module is not needed for a given application, the substrate bias for the devices in this module can be adjusted such that its leakage power is minimized. The range of the substrate bias voltage may be dependent on the type of devices used in the implementation of the module.

iv) Independent of the supply voltage, the clock signal to a given module can be dynamically disabled (stopped) when the operation of this module is not required in a given application.

Thus, benefits of the present system and method may include, but are not limited to the ability to adjust the clock frequency to one or more modules dynamically and/or adaptively; the ability to adjust the regulated voltage supplied to one or more modules dynamically and/or adaptively, based on the type of devices used in the implementation of the module; and the ability to adjust the substrate bias voltage to one or more modules dynamically and/or adaptively, based on the type of devices used in the implementation of the module. In turn, the choice of devices used in the implementation of a module may depend on one or more operational properties of a module. By compartmentalizing modules (functional units and/or functional clusters) to have well-defined operational properties, it is possible to select devices (for example transistors, diodes, etc.) which are part of a single electrical property class, or a subset of electrical property classes. This in turn permits the power management techniques discussed above, and discussed in further detail below through exemplary embodiments.

5. Exemplary Integrated Circuit (IC) According to the Present System and Method FIG. 2 illustrates an exemplary IC 200 according to the present system and method. Some elements of IC 200 are the same as those discussed above in conjunction with IC 100, and a detailed discussion of those elements will not be repeated here.

Like exemplary IC 100 which has exemplary functional units 110, exemplary IC 200 has one or more exemplary functional units 210, labeled as 210.1, 210.2, . . . , 210.N. Here again, any one functional unit 210.X of 210.1, 210.2, . . . , 210.N may serve a same purpose or function, a similar purpose or function, or a different purpose or function as any one other functional unit 210.Y of 210.1, 210.2, . . . , 210.N.

However, in IC 200, an exemplary functional unit 210 is now further sub-divided into two or more exemplary functional clusters 215. For example, functional unit 210 may have a first functional cluster 215.1, a second functional cluster 215.2, and a third functional cluster 215.3. Each functional clusters 215 is distinguished by the fact that all transistors within the functional cluster belong to the same electrical property class. For example, the first functional cluster 215.1 is composed exclusively of transistors 115.1 which all have a high threshold voltage (HVt). The second functional cluster, 215.2 is comprised of transistors 115.2 which all have a standard threshold voltage (SVt). The third functional unit, 215.3 is comprised of transistors 115.3 which all have a low threshold voltage (LVt). As a result, each functional cluster 215 is comprised exclusively of a single type or single class of transistor having a common electrical characteristic such as those having a high threshold voltage, a standard threshold voltage, or a low threshold voltage.

Persons skilled in the relevant arts will appreciate that the use of transistors 115 as the component class to illustrate the properties of functional clusters 215 is exemplary only. More generally, a functional cluster may be characterized by a designated component class (or classes) of electrical components which further share a common electrical characteristic, and therefore belong to a common electrical property class as well.

For example, the designated component class may be transistors of various types (for example, BJTs or FETs), but may also be diodes, optical switches or other optical components (such as laser elements), or other types of electrical components. The class of electrical components could even be, for example, capacitors sharing a substantially common capacitance and therefore possibly a common frequency response. In the present exemplary embodiment and further exemplary embodiments described below, the exemplary electrical components will typically be transistors. However, the present system and method entails grouping components with a same electrical property class, and it will be understood the present system and method may apply to component classes other than just transistors.

In order to design a functional unit with discrete functional clusters 215, it is necessary during the design process to consider which types of functions within the functional unit 210 may lend themselves to transistors 115 of a specific electrical property class. For example, some applications may require transistors which have a high threshold voltage, while other specific applications or functions lend themselves to transistors which may require a standard threshold voltage or a low threshold voltage. (A threshold voltage is one example of a critical voltage level.)

In practical applications (and assuming an exemplary supply voltage of about 1.2 volts), some electrical functions may lend themselves to MOSFETs which have a low threshold voltage (LVt) (for example, approximately 0.4 volts). Other electrical functions may require transistors which have a standard threshold voltage (SVt) (for example, approximately 0.5 volts), while yet other electrical operations or functions may require transistors which have a higher threshold voltage (HVt) (for example, approximately 0.6 volts). By combining transistors of the same electrical property class into modular units, referred to herein as functional clusters 215 having a common electrical characteristic, it is possible to fine tune the voltage supplied to each functional cluster 215 such that only the minimum voltage is supplied which is necessary for the functional cluster 215 to operate successfully.

Figure 3:
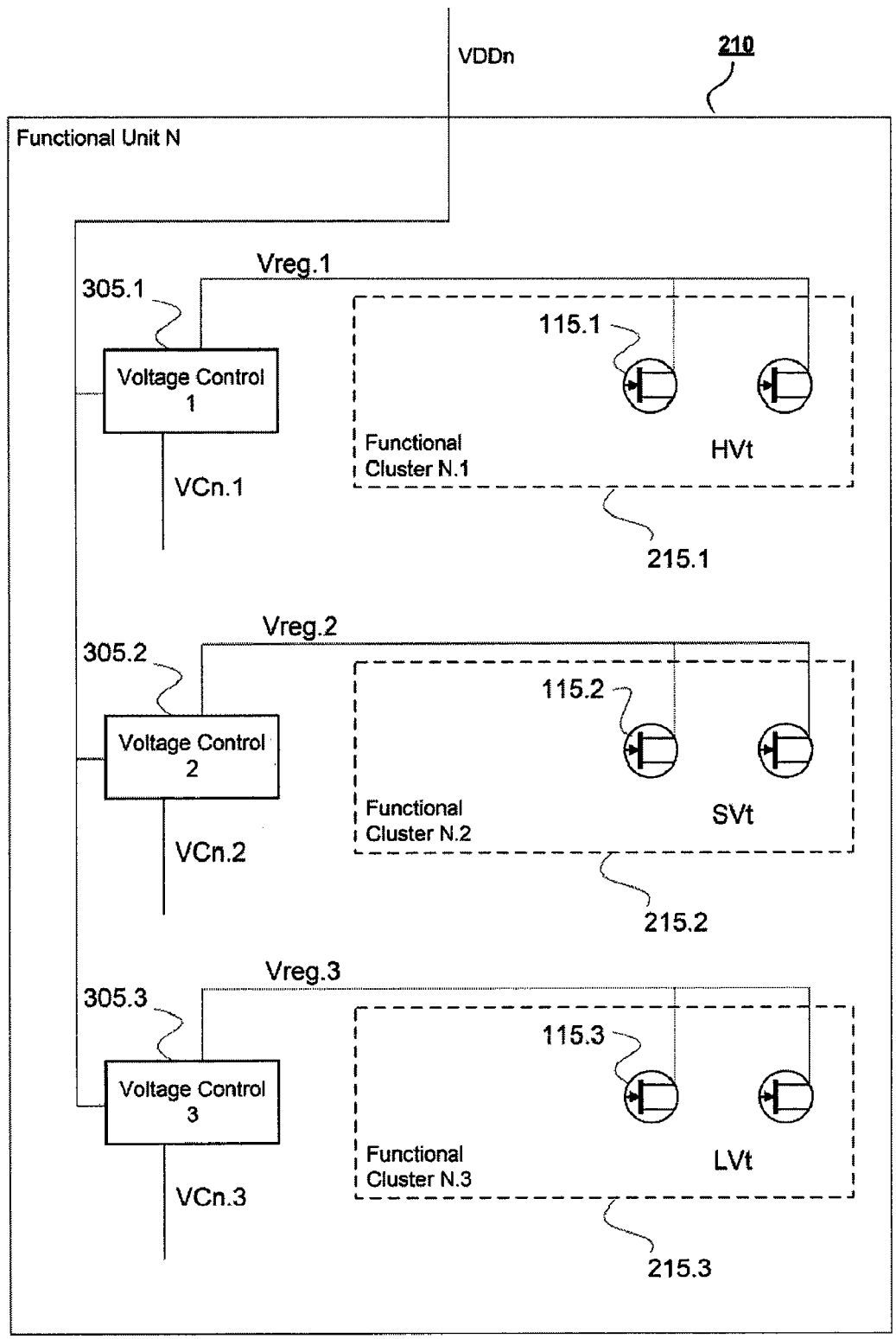
FIG. 3 is a block diagram of an exemplary functional cluster within an IC according to the present system and method.

This operational principle is further illustrated in FIG. 3, which presents a more detailed block diagram of an exemplary functional unit 210. It can be seen that each functional cluster, such as 215.1, 215.2, and 215.3 has its own associated voltage control unit 305.1, 305.2, and 305.3, respectively. Each voltage control unit 305 may be configured to take the regulated supply voltage VDDn and step down or step up that voltage to a voltage which is appropriate for the corresponding functional cluster. (In some cases, voltage control unit 305 may pass voltage VDD through to functional cluster 215 unchanged.) Voltage control unit 305 is said to deliver a regulated voltage Vreg to functional cluster 215, for example, Vreg.1 to functional cluster 215.1.

For example, regulated voltage Vreg.3 which is supplied by the third voltage control unit 305.3 to functional cluster 215.3 may be less than regulated voltage Vreg.2 which is supplied by second voltage control unit 305.2 to second functional cluster 215.2. Similarly, regulated voltage Vreg.2 supplied by the second voltage control unit 305.2 to second functional cluster 215.2 may be less than the regulated voltage supplied Vreg.1 by first voltage control unit 305.1 to the first functional cluster 215.1. In this way, even if all three functional clusters 215 are in operational use (that is, in an "active" operational state), the regulated voltage Vreg supplied to each functional cluster 215 may be fine-tuned or adapted to the specific needs of that particular functional cluster. This is made possible because each functional cluster 215 may be comprised exclusively of transistors 115 belonging to a same electrical property class, indicating they have a common electrical characteristic.

Each voltage control unit 305 of functional unit N may have a control line VCn (for example, VCn.1 for voltage control unit 305.1 of functional cluster N) which enables the voltage from voltage control unit 305 to be adjusted by control logic. For example, each voltage control unit 305 may receive a control signal via its respective control line VCn from Module/Cluster Power Supply Voltage Control 635 of IC Power Control Element 605 (see FIG. 6, below). A control signal received via control line VCn may, for example, indicate that functional cluster 215 is to be completely turned off if the functional cluster 215 is not required (that is, in a "powered off" state), or is to be reduced if the functional cluster is to be put into a low power, reduced frequency, or sleep state.

Figure 4:
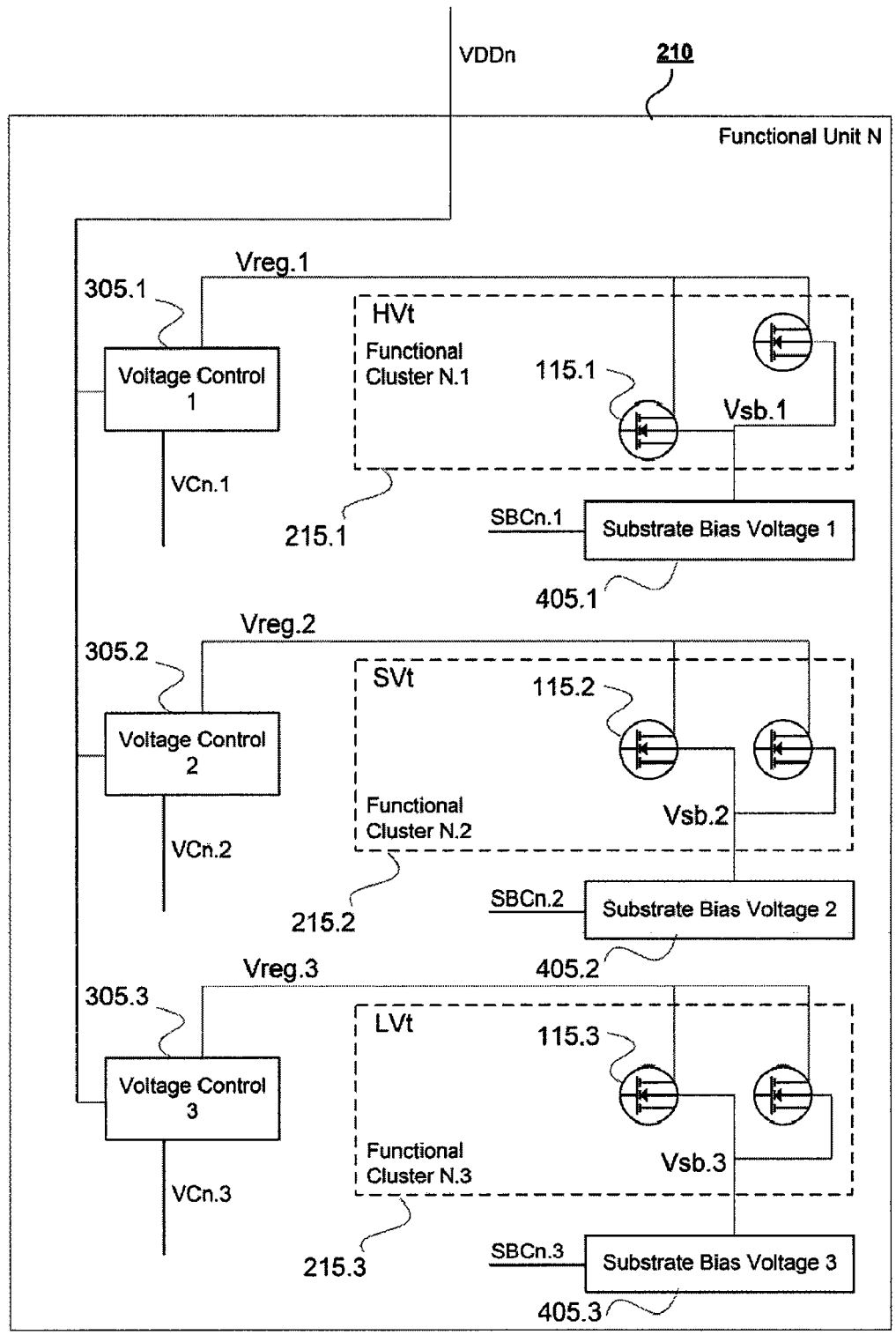
FIG. 4 is a block diagram of an exemplary functional cluster within an IC according to the present system and method.

FIG. 4 illustrates an embodiment of an exemplary functional unit 210 of exemplary IC 200. FIG. 4 repeats certain elements which have been previously discussed, the details of which will not be repeated here.

In FIG. 4 the transistors in each functional cluster 215 receive a substrate bias voltage from a substrate bias voltage generator 405. (A substrate bias voltage is another example of a critical voltage level.)

For example, first functional cluster 215.1 receives a substrate bias voltage Vsb.1 from substrate bias voltage generator 405.1. Similarly, the second and third functional clusters 215.2 and 215.3 receive respective substrate bias voltages Vsb.2, Vsb.3 from respective substrate bias voltage generators 405.2 and 405.3. The voltage Vsb supplied by each respective substrate bias voltage generator 405 of functional unit N may be determined via control signals received at generator 405 via control lines SBCn (for example, control line SBCn.1 for substrate bias voltage generator 405.1). For example, each substrate bias voltage generator 405 may receive a control signal via its respective control line SBCn from Module/Cluster Substrate Bias Voltage Control 645 of IC Power Control Element 605 (see FIG. 6, below).

By properly adjusting a substrate bias voltage to each functional cluster 215, it is possible to minimize the leakage current in each functional cluster. By reducing the leakage current, it is further possible to reduce the energy consumption within the functional cluster 215. Applying a cluster-specific-substrate bias voltage Vsb to each functional cluster 215 makes it possible to optimally minimize the leakage current for the functional cluster 215. Each cluster 215 contains transistors which belong to a common electrical property class, namely, a class of transistors 115 connected to a common substrate bias voltage. In this way, it is possible to minimize the power consumption for each functional cluster 215 within functional unit 210, and therefore help minimize the power consumption by IC 200.

In each case, the actual (that is, the applied) substrate bias voltage Vsb is an example of a regulated voltage, while the preferred voltage level to minimize power consumption is an example value of a critical voltage level. In typical operation, and whenever the operating environment and operating requirements permit, the regulated voltage level will be set to the critical voltage level in order to minimize power consumption.

Figure 5:
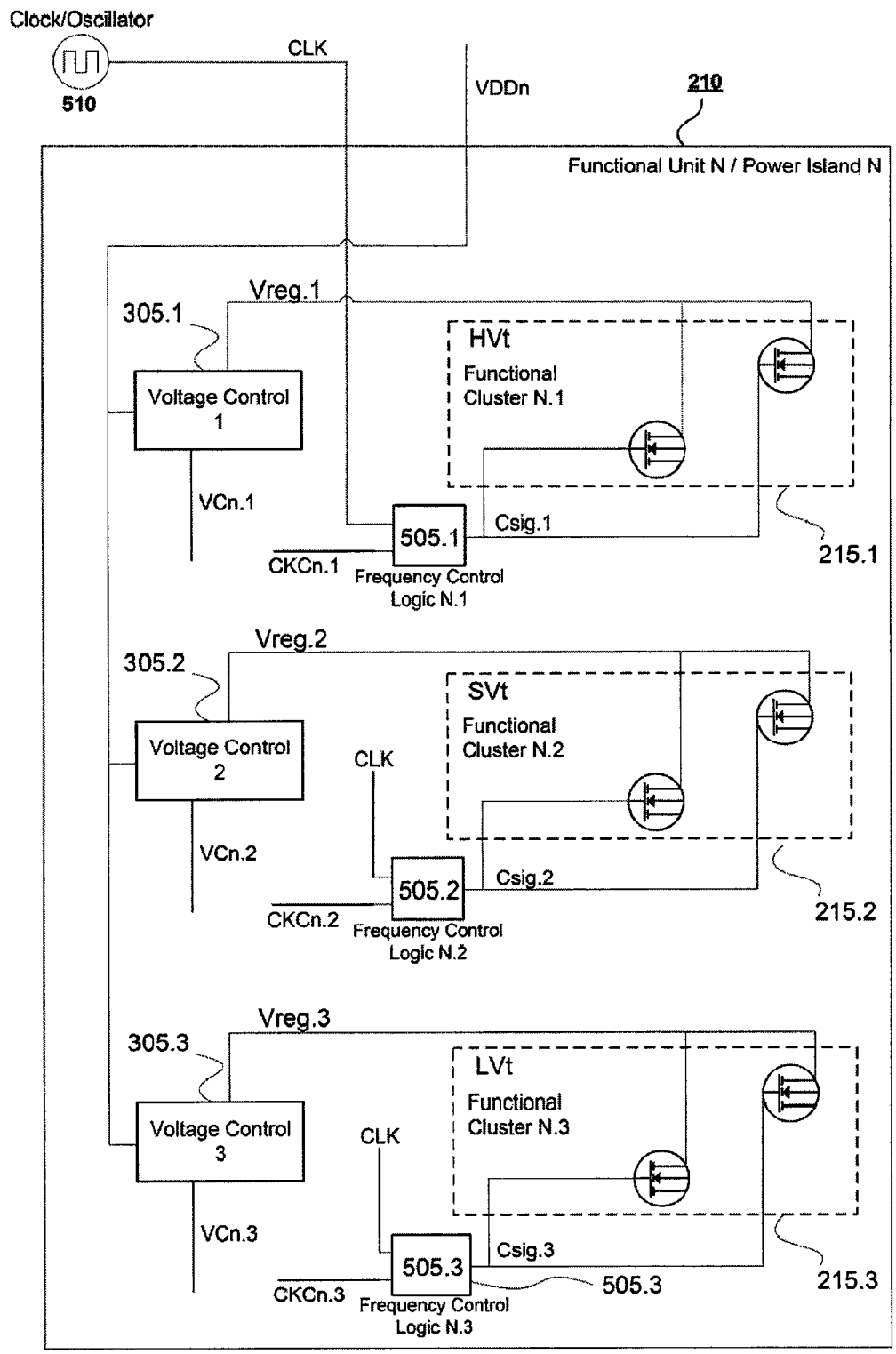
FIG. 5 is a block diagram of an exemplary functional cluster within an IC according to the present system and method.

FIG. 5 illustrates another embodiment of an exemplary functional unit 210 of exemplary IC 200. Certain elements of functional unit 210 have already been discussed above and the details of the discussion will not be repeated here.

Exemplary functional unit 210 now has an associated clock source 510 which provides a clock signal to functional unit 210. In addition, each functional cluster 215 has an associated frequency control logic 505. For example, first functional cluster 215.1 has frequency control logic 505.1. Similarly, second and third functional clusters 215.2 and 215.3 each have respective associated frequency control logic 505.2 and 505.3. Each frequency control logic 505 receives the clock signal from clock source 510 via clock signal line CLK. Frequency control logic 505 may be a frequency divider or a frequency multiplier which enables each functional cluster 215 to be driven at its own respective clock frequency. Frequency control logic 505 may perform other clock related logic and/or gating functions as well. Each cluster 215 contains transistors which belong to a common electrical property class, namely, a class of transistors 115 with a common clock frequency that may operate up to the same maximum clock frequency.

Because each functional cluster 215 is composed of components of a single electrical property class, it may be possible to configure each functional cluster 215 to operate at a different clock frequency. As a result, the frequency control logic 505 associated with each functional cluster 215 may drive functional cluster 215 at a clock frequency or clock signal Csig which is suitable for the purpose or the capabilities of the application of functional cluster 215, independent of other functional clusters. For example, frequency control logic 505.1 drives functional cluster 215.1 via clock signal Csig.1. Since lower clock frequencies are typically associated with reduced power consumption, this makes it possible to minimize the power consumption for each functional cluster 215. In turn, this minimizes the power consumption for functional unit 210 and IC 200 as a whole. Each frequency control logic 505 of functional unit N may receive frequency control signals or clock control signals via a control line CKCn (for example, control line CKCn.1 controls frequency control logic 505.1). Each frequency control logic 505 may receive a control signal via its respective control line CKCn from Module/Cluster Clock Signal Control 640 of IC Power Control Element 605 (see FIG. 6, below).

6. Another Exemplary IC

Figure 6:
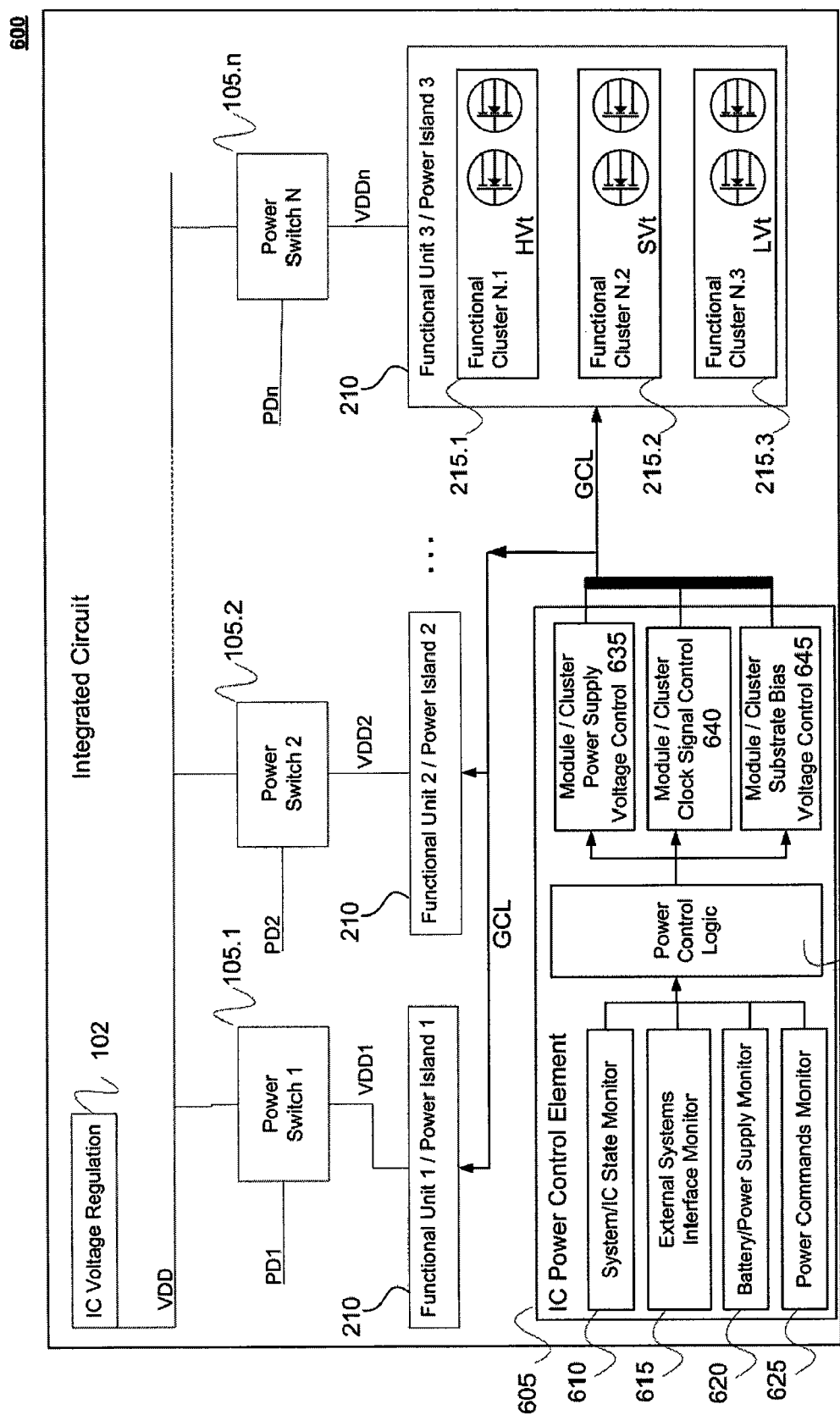
FIG. 6 is a block diagram of an exemplary IC according to the present system and method.

FIG. 6 illustrates an embodiment of another exemplary IC 600 according to the present system and method. Exemplary IC 600 has some elements in common with exemplary IC 200 discussed above (see FIGS. 2-5), and the details of those elements will not be repeated here.

Exemplary IC 600 includes an IC power control element 605. IC power control element 605 in turn may be comprised of a number of modules which can regulate the power consumed by each functional unit 210 and each functional cluster 215 of exemplary IC 600. Control by IC power control element 605 is exerted through general control lines GCL. An exemplary single common bus GCL is shown conveying signals from module/cluster power supply voltage control 635, module/cluster clock signal control 640, and module/cluster substrate bias voltage control 645 (all discussed further below) to functional units 215. In an alternative embodiment, separate buses may be employed from voltage control 635, signal control 640, and/or bias voltage control 645 to functional units 215. Other couplings methods may be employed as well.

Exemplary IC power control element may be comprised of a system or IC state monitor 610, an external systems interface monitor 615, a power supply or battery monitor 620, a power commands monitor 625, power control logic 630, a module/cluster power supply voltage control 635, a module/cluster clock signal control 640, and a module/cluster substrate bias voltage control 645.

System or IC state monitor 610 may serve to maintain monitor and gather status information for functions throughout IC 600. For example, IC state monitor 610 may obtain information on which functional units are currently in use, or which functional clusters are currently in use, or both or which functional clusters are likely to require a higher clock frequency within a predetermined period in order to support an application. It may also maintain information on a voltage currently being applied to functional units 210, or functional cluster 215, or, similarly, on clock speeds or substrate bias voltages for functional units 210 and functional clusters 215.

External systems interface monitor 615 may maintain status information on data or signals being received by IC 600 from other ICs, and also maintain information on data or signals being supplied or to be supplied by IC 600 to other ICs or other external systems.

Power supply or battery monitor 620 may maintain information on the total power available to and/or being supplied to IC 600. For example, power supply monitor 620 may maintain information on the voltage currently being supplied by IC voltage regulation 102.

Power commands monitor 625 may receive specific power management commands for IC 600. Such power management commands may be provided by other power regulation logic which is external to IC 600, or may be supplied by software which is driving or running IC 600, or such commands may be received via software or via hardware from a user who is controlling a technology (for example, a computer) associated with IC 600.

Module/cluster power supply voltage control 635 is configured to control the regulated voltage which is supplied to a functional unit 210 or to a functional cluster 215. For example, module/cluster power supply voltage control 635 may control power switches 105 or may control voltage regulation modules 305 (not illustrated in FIG. 6, see FIG. 3).

Similarly, module/cluster clock control signal 640 may control the clock signals and the clock frequencies which are supplied to a functional unit 210 or to a functional cluster 215. For example, module/cluster clock signal control 640 may send control signals to oscillator 510 (see FIG. 5) or to frequency control logic 505 (see FIG. 5).

Module/cluster substrate bias voltage control 645 may be similarly configured to control the substrate bias voltage applied to functional clusters 215. For example, module/cluster substrate bias voltage control 645 may be coupled to substrate bias voltage control generators 405 (not shown here, see FIG. 4).

In this way, module/cluster power supply voltage control 635, clock signal control 640, and substrate bias voltage control 645 are configured to regulate respective supply voltages, clock signal speeds, and substrate bias voltages throughout IC 600. Because transistors 115 are clustered into functional clusters 215, which typically comprise transistors of a common electrical property class, it is possible to fine-tune the supply voltages, clock signals or clock speeds, and substrate bias voltages to optimum values for each functional cluster. Because each functional cluster is comprised of transistors of a common electrical property class, some functional clusters will be amenable to lower voltages, higher substrate bias and hence lower leakage currents, or reduced clock speeds, as compared to other functional clusters. This results in an overall reduction of power consumption by IC 600.

IC state monitor 610, external systems interface monitor 615, power supply monitor 620, and power commands monitor 625 may be considered as sensing or input elements for IC power control 605. Similarly, module/cluster power supply voltage control 635, clock signal control 640, and substrate bias voltage control 645 may be considered control elements for IC power control element 605.

Coupling the input or monitoring elements with the power control elements is power control logic 630. Power control logic 630 serves to integrate monitoring data and commands supplied to IC 600, and further serves to determine which functional units 210 and which functional clusters 215 require power, and the amount of power they require (that is, the regulated voltage(s) which should be applied), along with their clock speeds and substrate bias voltages.

An exemplary power management algorithm which may be implemented by IC power control element 605, and in particular controlled or processed via power control logic 630, is presented below as method 1000 in conjunction with FIG. 10.

Persons skilled in the relevant arts will appreciate that the precise logic of power control logic 630 will be specific to the actual function served by functional units 210 and functional clusters 215. Persons skilled in the relevant arts will further appreciate that IC power control element 605 may be implemented in a number of ways including, for example, as a microprocessor module within IC 600, along with associated memory and possibly with read-only memory (ROM), one-time programmable (OTP) ROM or multiple-time programmable (MTP) ROM to supply the necessary control logic. Alternatively, IC power control element 605 may be implemented as a dedicated, hardwired control logic. Alternatively, some or all of IC power control element 605 may be off-chip from IC 600. For example, power control logic 630 may be provided by a processor (a CPU) coupled to IC 600.

7. Another Exemplary IC

Discussed above are several exemplary embodiments of an integrated circuit 200, 600 according to the present system and method. In those embodiments, IC 200, 600 was subdivided into functional units 210, each with its own power switch 105, and each functional unit was further divided into functional clusters 215, as already discussed above. However, organization of IC 200, 600 into functional units 210 which are further divided into submodules (referred to as functional clusters 215) represents only one possible, exemplary organization of an integrated circuit according to the present system and method.

Figure 7:
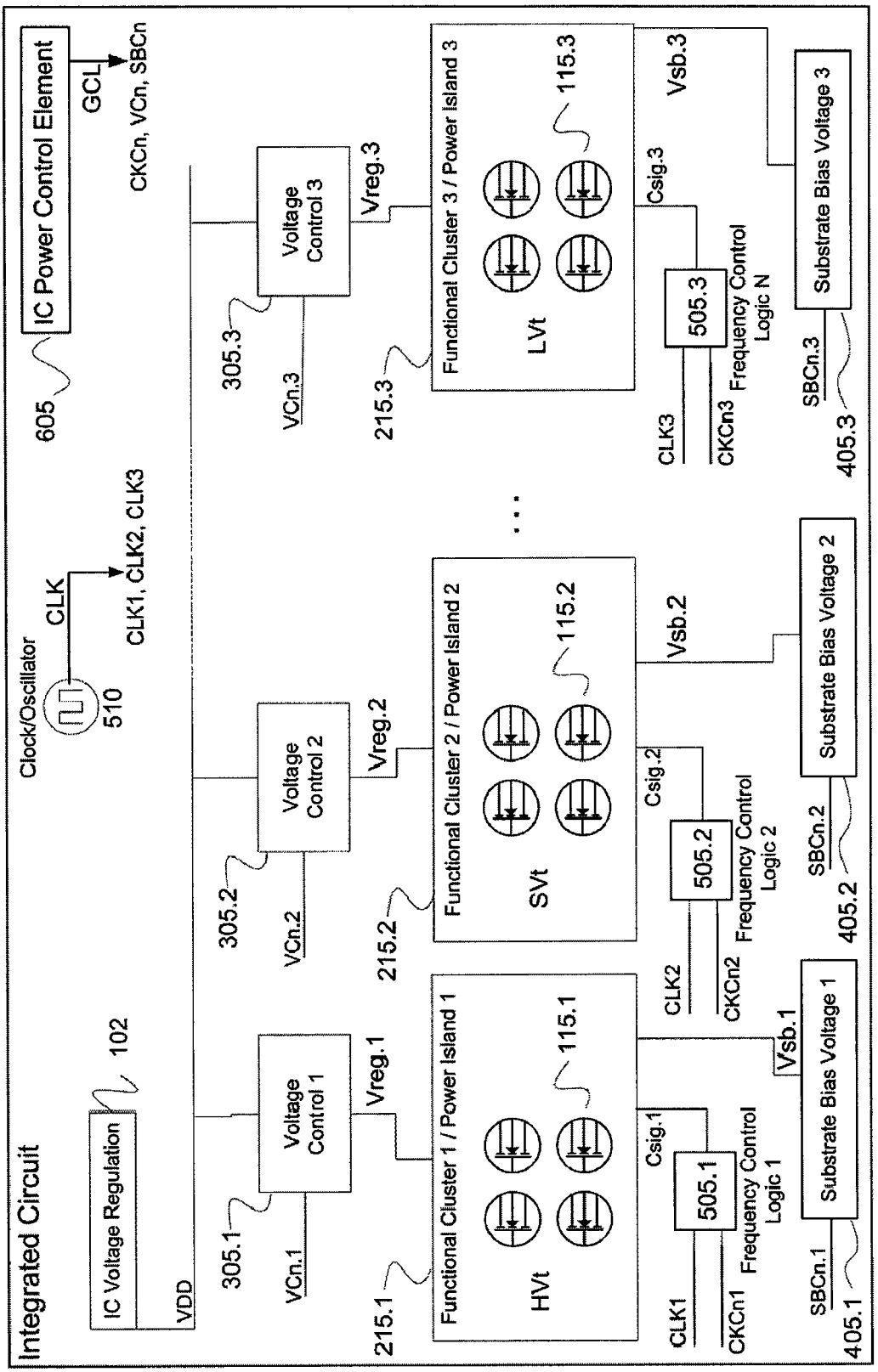
FIG. 7 is a block diagram of an exemplary IC according to the present system and method.

FIG. 7 illustrates an embodiment of another exemplary IC 700 according to the present system and method. Exemplary IC 700 has some elements in common with exemplary ICs 200 and 600 discussed above, and the details of those elements will not be repeated here. Note that although not illustrated in FIG. 7, IC power control element 605 is coupled via control lines GCL to functional clusters 215 for purposes of signaling, monitoring, and/or control. Various other control signals, such as control signals VCn to voltage control 305, control signals SBCn to substrate bias voltage generators 405, and clock control signals CKCn to frequency control logic modules 505, may also be received via control lines GCL from IC power control element 605. Similarly, frequency control logic modules 505 are connected to clock 510 via line CLK. In FIG. 7, voltage control 305 is illustrated as being external to functional cluster 215. In an alternative embodiment, some or all of voltage control elements 305 may be internal to, or be a component of, some or all of functional clusters 215.

In IC 700 the highest level modular organization of functionality is into top level functional clusters 215, such as a first functional cluster 215.1, a second functional cluster 215.2, and possibly additional functional clusters 215.

Each functional cluster 215 has an associated voltage control unit 305 which provides a regulated voltage Vreg suitable for the transistors 115 of the functional cluster. The exact regulated voltage Vreg supplied by voltage regulation 305 will depend on the electrical property class or operational property class of the transistors of the functional cluster 215 and/or a common electrical characteristic of the functional cluster 215. For example, a different voltage Vreg will be supplied depending on whether the transistors 115 of the functional cluster have a critical voltage level (in this case, a threshold voltage level) which is a low voltage threshold (LVt), a standard voltage threshold (SVt), or a high voltage threshold (HVt).

Similarly, each functional cluster 215 may have its own frequency control logic 505, and may also have its own substrate bias voltage generator 405. For example, functional cluster 215.1 receives clock signal Csig.1 from frequency control logic 505.1 and substrate bias voltage Vsb.1 from substrate bias voltage generator 405.1. In this way, it may be possible to optimize a clock frequency and a regulated voltage supplied to functional clusters 215 according to the electrical property class of transistor for each functional cluster.

8. Another Exemplary IC

Figure 8:
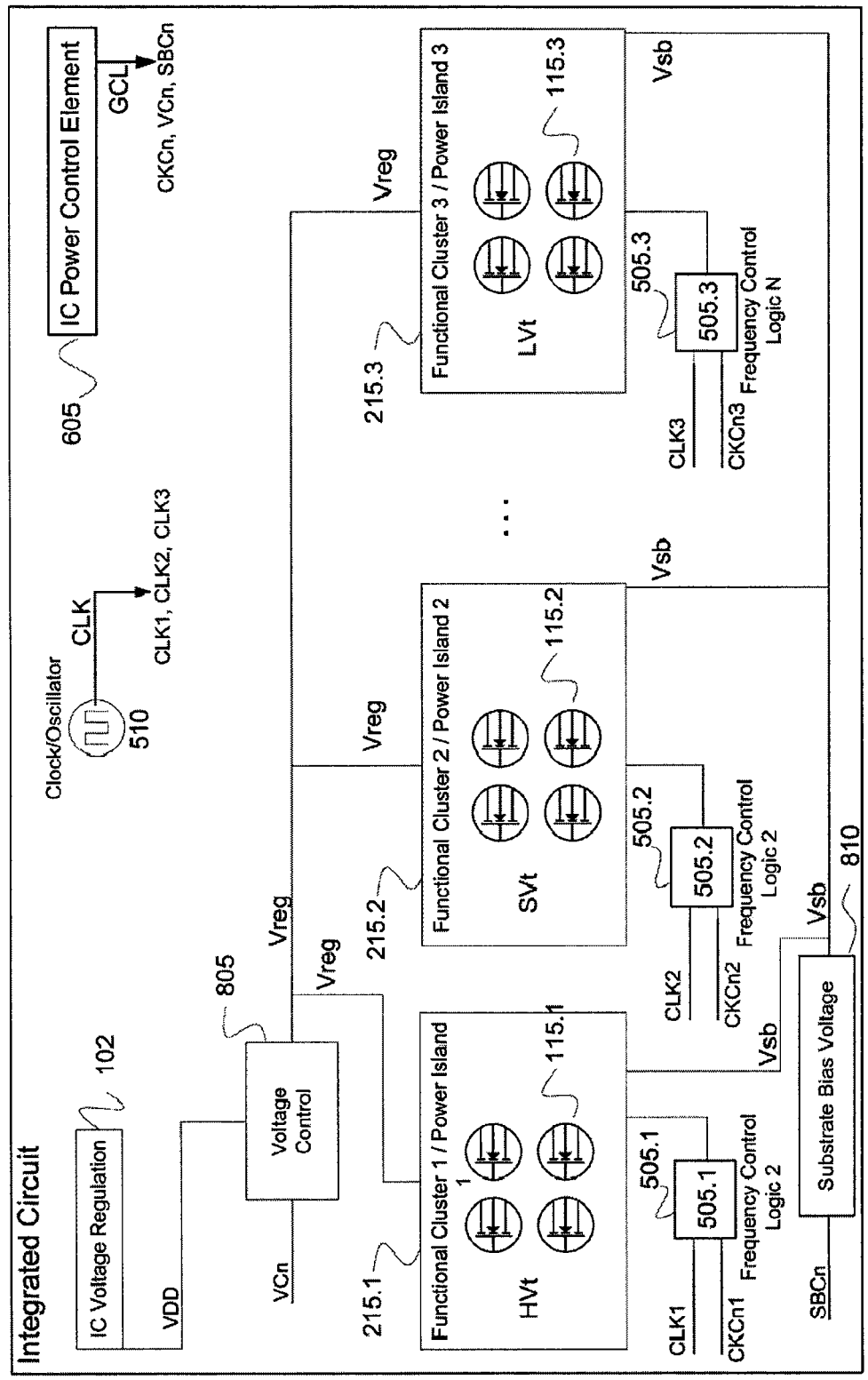
FIG. 8 is a block diagram of an exemplary IC according to the present system and method.

FIG. 8 depicts an embodiment of another exemplary IC 800 according to the present system and method. Some elements of IC 800 have been discussed previously in conjunction with several figures above, and in particular in conjunction with FIG. 7 with respect to the overall modular organization of IC 800, and the discussion will not be repeated here. Note that although not illustrated in FIG. 8, IC power control element 605 is coupled via control line GCL to functional clusters 215 for purposes of signaling, monitoring, and/or control. Various other control signals, such as control signals VCn to voltage control 305, control signals SBCn to substrate bias voltage generators 405, and clock control signals CKCn to frequency control logic modules 505, may also be received via control lines GCL from IC power control element 605. Similarly, frequency control logic modules 505 are coupled to clock 510 via line CLK.

In IC 800 each functional cluster 215 is comprised of transistors 115 belonging to a common electrical property class. Each different functional cluster 215.1, 215.2, 215.N, however, is comprised of transistors (115.1, 115.2, and 115.N, respectively) which belong to a different electrical property class from the transistors of the other functional clusters. Each functional cluster 215 is also supplied a regulated voltage Vreg which is supplied by a common voltage regulator 805. (This is unlike embodiments discussed above, for example in conjunction with FIG. 7, where each functional cluster 215 had its own dedicated voltage regulation.) In the configuration shown, each functional cluster, such as functional cluster 215.1, 215.2, and 215.3, will receive a common regulated voltage value Vreg from voltage control 805.

An advantage of this configuration is that when voltage Vreg is reduced down below a supply threshold voltage applicable to a first functional cluster 215.1, functional cluster 215.1 automatically ceases operation because the supplied voltage is below the threshold voltage required for its operation. At the same time, however, and provided that voltage Vreg remains above the threshold voltage applicable to functional cluster 215.2 and 215.3, functional clusters 215.2 and 215.3 remain in operation. This "supply threshold" voltage may be determined in conjunction with, but independent of the transistor threshold voltages, e.g., LVt, SVt, HVt. For example, an application-specific or system-event-specific supply threshold voltage may be determined in real time by power control logic 630 of IC power control element 605, and relayed to voltage control 805 via power supply voltage control module 635 of IC power control 605.

Similarly, it is possible to lower the voltage Vreg below the threshold voltage applicable to both functional clusters 215.1 and 215.2. However, as long as the voltage Vreg supplied by voltage regulation 805 remains above the threshold voltage applicable to functional cluster 215.3, functional cluster 215.3 remains operational.

Similarly, in IC 800 a common substrate bias voltage regulator 810 applies a common substrate bias voltage Vsb to all three functional clusters 215.1, 215.2, and 215.3. However, if one or more functional clusters are in an active state (for example, the applied source voltage exceeds the bias voltage), these functional clusters may exhibit no loss of performance or minimal loss of power due to leakage currents. This means the substrate bias voltage may then be fine-tuned for a functional cluster which is in an inactive state and reduce its power consumption.

An exemplary practical application of embodiment 800 is an IC comprising both control logic and memory. A functional module comprising memory elements may be comprised of LVt FETs, while the control logic may be comprised of SVt or HVt FETs. It is possible to lower the regulated supply voltage so that threshold voltage requirement applicable to the LVt module(s) is supported, but the threshold voltage requirements applicable to the SVt or HVt module(s) is not supported. In this way, the control logic is temporarily powered off, while the memory elements retain their data. At the same time, the overall power consumption of IC 800 is reduced.

By way of exemplary embodiment, functional clusters 215.1, 215.2, and 215.3 are illustrated as each having separate frequency control logic 505.1, 505.2, and 505.3, respectively. In this way, it is illustrated that while each functional cluster may share a common voltage regulation 805, or may share a common substrate bias voltage generator 810, other aspects of driving or regulating a functional cluster 215 (such as a clock frequency) may be specific to the functional cluster in question.

Persons skilled in the relevant art will recognize that other combinations of shared driving elements and cluster-specific driving elements may be employed. For example, each functional cluster 215 may have its own voltage regulation, and each functional cluster 215 may have its own substrate bias voltage, however, a common clock may be used to drive all the functional clusters. In this way it is possible to implement various specific mechanisms for minimizing power consumption and maximizing essential local control of functional clusters, while also ensuring that certain functions or parameters are consistent throughout IC 800, as may be necessary for a particular application at hand.

9. An Exemplary Method for Designing an IC

Figure 9:
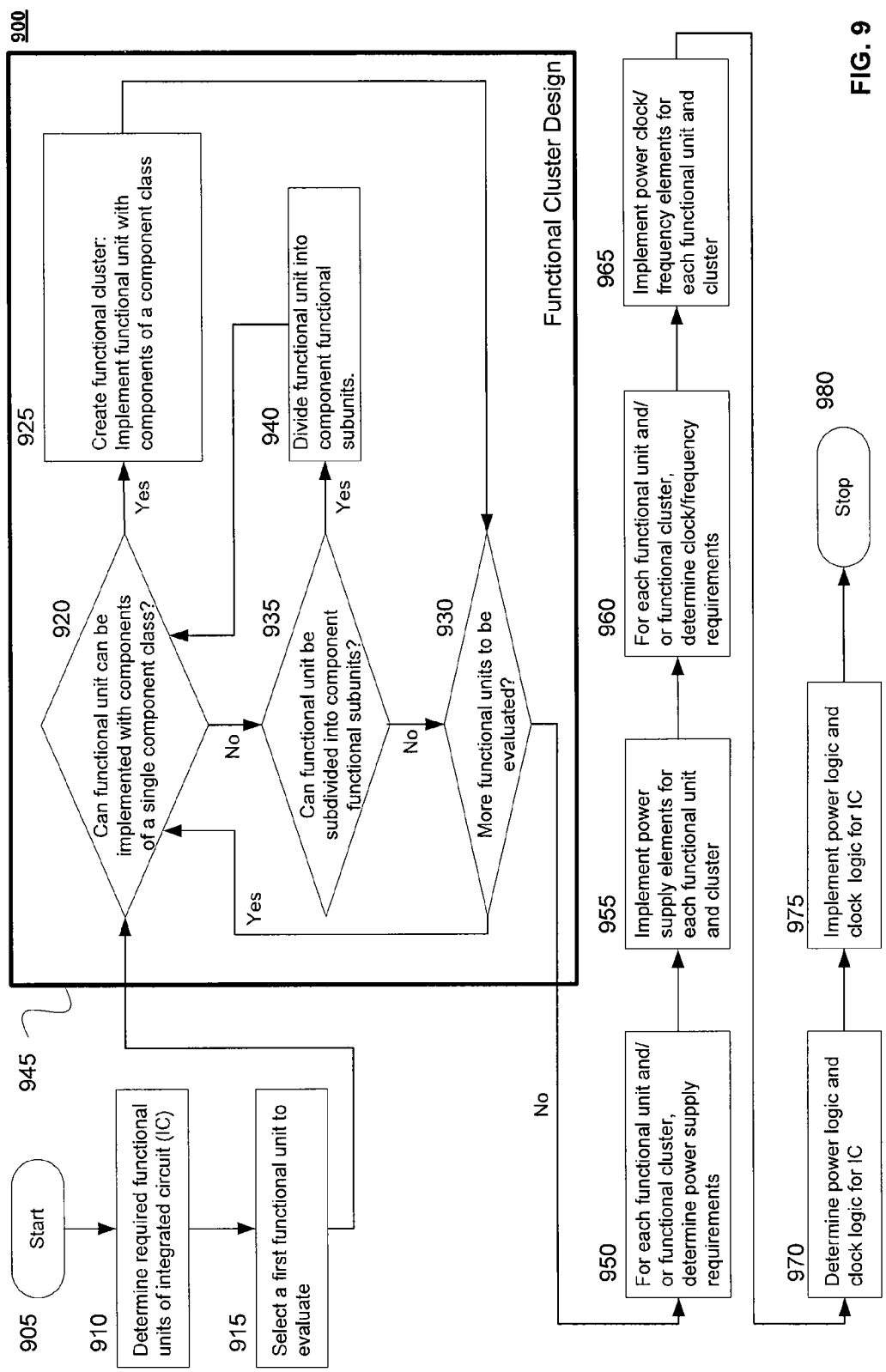
FIG. 9 is a flowchart of an exemplary method for designing an IC according to the present system and method.

FIG. 9 is a flowchart of an exemplary method 900 for designing an integrated circuit (IC) according to the present system and method. The method begins at step 905 and continues immediately with step 910. In step 910, a determination is made as to the functional requirements of the IC (also known as "applications") such that a further determination can be made as to functional units of the IC. In this way a list of functional units of the IC is created.

In step 915, a first functional unit is selected for evaluation.

Steps 920, 925, 930, 935, and 940 together comprise a functional cluster design step 945. Step 945 begins at step 920 with the evaluation of a given functional unit, such as the first functional unit. In step 920, an evaluation is made as to whether the functional unit can be implemented with components of a single electrical property class. For example, an evaluation is made as to whether the functional unit can be implemented exclusively with MOSFETs with a low threshold voltage, a standard threshold voltage, or a high threshold voltage. If such an implementation can be made, then in step 925 a functional cluster is created. The functional cluster implements the functional unit with components of the functional class suitable for that functional unit.

The method then moves to step 930 where determination is made if more functional units remain to be evaluated. If so, then the additional functional units are evaluated at step 920 to determine if it can be implemented with components of a single electrical property class. If the determination is yes, the method proceeds with step 925 as already discussed above.

If at step 920, it is determined that the functional unit cannot be implemented with components of a single electrical property class, then at step 935 an evaluation is made as to whether the functional unit can be subdivided into component functional subunits. If the answer is yes, then at step 940 the functional unit is divided into component functional subunits. The method then continues back at step 920, where each functional unit in turn is evaluated, to determine if it can be implemented with components of a single electrical property class. The method then continues as before, with either steps 925 or 935.

At step 930, it may be determined there are no more functional units to be evaluated. In that case method 900 continues at step 950. At step 950, for each functional unit and or functional cluster, a determination is made as to power supply requirements. At step 955, an implementation is made of power supply elements for each function unit and cluster. At step 960, for each functional unit or functional cluster, a determination may be made as to a required clock or frequency requirements. At step 965, the necessary clock or oscillator elements are implemented to drive each functional unit or functional clusters. At step 970, a determination is made as to power logic and clock logic for the IC, and at step 975 power logic and clock logic for the IC are implemented. The method terminates at step 980.

It will be recognized based on the discussion above that in steps 950 and 960, where a determination is made as to power supply requirements and clock requirements, different functional clusters will require different power levels and possibly different clock or frequency driving requirements, based on the electrical property class of components in the functional cluster (for example, based on the electrical property class of the transistors). In this way different power requirements and frequency requirements can be implemented for different functional clusters, resulting in overall reduction of power for the IC.

10. Exemplary Method for Real Time Dynamic Power Minimization for an IC

Figure 10:
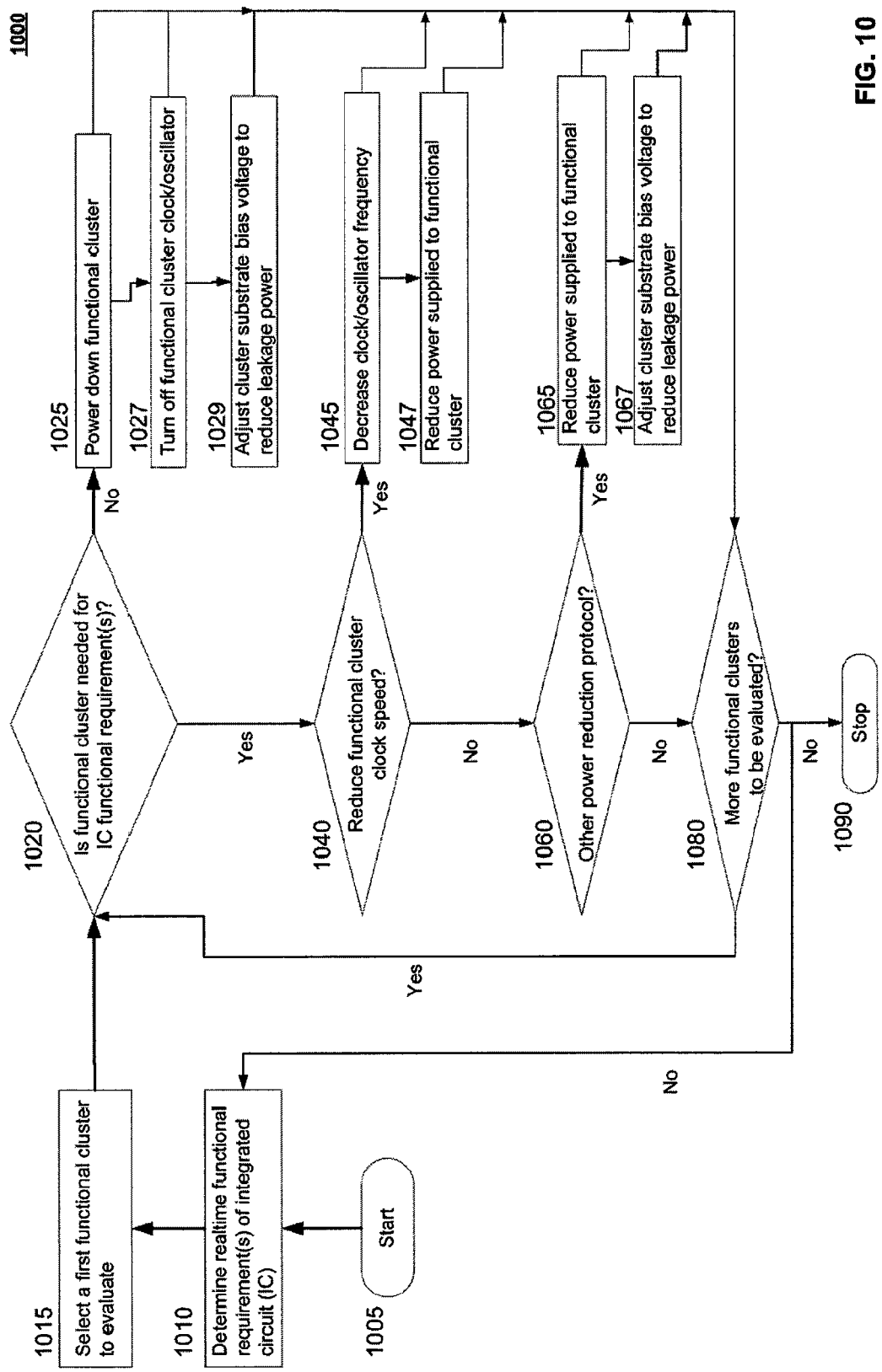
FIG. 10 is a flowchart of an exemplary method for allocating power on an IC according to the present system and method.

FIG. 10 is a flowchart of an exemplary method 1000 for dynamically and/or adaptively minimizing power consumption by an integrated circuit according to the present system and method. Method 1000 assumes that an integrated circuit has been implemented as described above, that is, with an organization of components substantially similar to those in exemplary IC embodiments 200, 600, 700, or 800, wherein functional aspects of the integrated circuit have been modularized into functional clusters 215. Further, it is assumed that different functional clusters 215 have different voltage requirements, different clock speed requirements, or other requirements which affect their power consumption. Method 1000 may be implemented or controlled by an IC power control element 605 (not shown here, see FIGS. 6, 7, and 8 above).

Method 1000 begins at step 1005 and continues immediately with step 1010.

At step 1010 a determination is made as to real-time functional requirements of the integrated circuit (that is, a determination is made as to an application or applications to which the IC will be applied). Specifically, a determination is made as to the current use or immediate future use to which the integrated circuit may be put. For example, if the circuit is dedicated to digital signal processing (DSP) for audio applications a determination may be made as to whether the expected audio quality is to be a low quality, a medium quality, or a high quality. This determination in turn may determine whether low frequency, medium frequency, or high frequency elements of the DSP IC are to be used.

This determination and similar determinations appropriate to a given IC may be made through a combination of data from various internal IC monitoring systems (for example, IC state monitor 610, external systems interface monitor 615, power supply monitor 620, and power commands monitor 625, see FIG. 6 above) and control logic (executed for example by power control logic 630, see again FIG. 6 above).

At step 1015 a first functional cluster is selected for evaluation. At step 1020 a determination is made as to whether the selected functional cluster is needed for the current IC functional requirements. If the answer is no, then at step 1025 power may be turned off for the functional cluster. At step 1027, which is optional, the clock or oscillator associated with the functional cluster may be turned off, and at step 1029, which is optional, the cluster substrate bias voltage may be adjusted to reduce leakage power associated with leakage current. Any of steps 1025, 1027, and 1029 may continue with step 1080, where it is determined if more functional clusters are to be evaluated.

Returning to step 1020, if a determination is made that the functional cluster is needed for current or anticipated IC functional requirements, the method continues at step 1040. At step 1040 a determination is made as to whether it is possible to reduce the clock speed associated with the functional cluster. For example, if for a DSP IC only a low audio quality is required, it may be possible to reduce the clock speed associated with the functional cluster. If the answer is yes, then at step 1045 the clock or oscillator frequency associated with the functional cluster is reduced, and at optional step 1047 the power supply to the functional cluster may be reduced. Either step 1045 or 1047 may continue with step 1080. If at step 1040 a determination is made that a clock speed cannot be reduced or is not applicable, the method continues with step 1060.

At step 1060 a determination is made as to whether other power reduction protocols may be appropriate. The basis for such a determination may vary widely depending on both the type of the IC, an application of the IC, and a specific purpose of a specific functional cluster. For example, if a determination is made in step 1060 that voltage to a functional cluster may be reduced, then at step 1065 the voltage to the functional cluster is reduced. At optional step 1067, the cluster substrate bias voltage may be reduced or may be modified to reduce leakage power. Either of steps 1065 or 1067 may continue with step 1080.

At step 1080 a determination is made as to whether more functional clusters are to be evaluated. If the answer is yes, the method continues with step 1020 where a determination is made if a functional cluster is needed for current or anticipated IC functional requirements. Alternatively, at step 1080 if no more functional clusters are to be evaluated then the method may either return to step 1010, determining a real time functional requirement of the integrated circuit, or the method may stop at step 1090.

For any given functional cluster, an actual applied voltage or clock speed will depend not only whether the cluster is operational at a given time, but also on voltage and clock speed requirements which are specific to the electrical property class of the components in the cluster. In turn, and whenever possible, the components in each functional cluster have been selected during the design stage (as per exemplary method 900 above, see FIG. 9) to be of a electrical property class that requires the minimum power and or speed requirements consistent with the function of the cluster. Consequently, power consumption in the IC is minimized because specific functional clusters consume the minimum necessary power to perform their task.

The actual control of voltages and clock speeds may be made by power control logic 630 (see FIG. 6 above) in combination with module/cluster power supply voltage control 635, module/cluster clock signal control 640, and module/cluster substrate bias voltage control 645 (see FIG. 6 above), and further in combination with various cluster voltage and clock control elements, discussed above in conjunction with various figures.

Persons skilled in the relevant arts will recognize that the steps described above, as well as the order of the steps, are exemplary only. The order of steps may be changed, and some steps eliminated or added, while remaining within the scope and spirit of the present invention.

11. Alternative Embodiments (a) Functional Clusters and Electrical Property Classes In embodiments described and illustrated above, a functional cluster has been described and illustrated as exclusively having components of only a single electrical property class. For example, a functional cluster has been illustrated as only having transistors with a single threshold voltage such as, for example, a low threshold voltage.

In alternative embodiments, a functional cluster may employ components that have more than one functional class. For example, a functional cluster may have transistors have a low threshold voltage and also other transistors that have a standard threshold voltage. Provided that a functional cluster comprises components that do not span the fall range of electrical property classes (for example, low, standard, and high threshold voltages), it may still be the case that having only a limited selection of components from a limited number of electrical property classes in a functional cluster may yield reduced power consumption or specialized power requirements. There may be other embodiments where a functional cluster may be comprised of transistors with high switching threshold and also long gate lengths.

In alternative embodiments, a functional cluster may employ components that have the same operational property class or combinations of operational property classes. Similarly, a functional cluster may employ a combination of an electrical property class and an operational property class.

(b) Component Types

Although exemplary embodiments described above have employed MOSFETs, the present system and method is not limited to MOSFETs. The system and method applies as well to any electrical components which have recognized classes or gradations of electrical properties, including other types of field effect transistors (FETs) such as JFETs, to bipolar junction transistors (BJTs), and to diodes. The system and method may also apply to other solid state components which may be classified into electrical property classes by other properties. For example, a system employing laser light sources (such as light emitting diodes, or LEDs) or a system employing optical switching elements, magnetically active components, and other such components may also achieve power reduction using the system and method described herein.

(c) Combining Functional Clusters and Standard Modules on A Single IC

In exemplary embodiments described above, exemplary ICs 200, 600, 700, and 800 have been illustrated as being comprised exclusively of functional clusters, that is, of modules which have electrical components of a single electrical property class, or components selected from only a subset of the available electrical property classes.

In practice, some functional units (that is, operational modules) within an IC may not lend themselves to being functional clusters, or to being subdivided into functional clusters. That is to say, some functional units may required components from all available electrical property classes.

It will be apparent to persons skilled in the relevant arts that the present system and method may still be employed provided at least some of the functional units of an IC may be designed as functional clusters, or may be subdivided into functional clusters. That is to say, for those modules of an IC which are functional clusters, power savings for the IC as a whole is still achieved due to the capability of applying cluster-specific voltages, clock frequencies, and other electrical inputs or regulation.

(d) Combining Families of Solid State Devices on a Single IC

In exemplary embodiments described above, exemplary ICs 200, 600, 700, and 800 have been illustrated as being comprised exclusively transistors from the MOSFET family of solid state devices. As already discussed above, the present system and method may be implemented with other families of solid state components as well. In addition, the present system and method may be implemented with hybrid ICs, that is, ICs which employ solid state devices from more than one family of components, for example, MOSFETs and BJTs.

In one embodiment of the present system and method, an IC design process may modularize an IC layout or organization so that all MOSFETs receive power and timing signals from one voltage source and one clock source, while all BJTs receive power and timing signals from a separate voltage source and clock source. By customizing voltages and clocking separately for MOSFET modules and BJT modules, optimized power consumption (that is, minimized power consumption) may be achieved for the IC.

In an alternative embodiment, additional power reductions may be achieved by modularizing the MOSFETs into functional clusters, as already described above, and similarly by modularizing the BJTs into functional clusters.

Other hybrid IC designs, with other families of solid state components, may be envisioned as well.

(e) Electrical Property Classes and Ranges of Components

In exemplary embodiments described above, exemplary ICs 200, 600, 700, and 800 have been illustrated as being comprised exclusively of transistors from discrete electrical property classes, for example MOSFETs characterized as HVt, SVt, or LVt.

Persons skilled in the relevant arts will appreciate that, in many cases, solid state components may be fabricated with a range of electrical properties, rather than just specific classes. For example, in a MOSFET the size of a gate or the composition of a gate, or both, can be controlled during the fabrication process, and the choice of gate composition and size determines in part the power consumption. Consequently, it is possible to design a module (such as a functional cluster) where the components have a range of critical voltage levels or, additionally or alternatively, to design a module where the components have a range of allowed maximum or minimum clock speeds.

The present system and method may still be employed to achieve power savings on an IC, provided the solid state components in a functional cluster have critical voltage levels, clock speeds, or other electrical parameters which fall into a defined range, wherein the defined range is a subset of the full possible range associated with the family of solid state devices.

(f) Frequency Related Considerations

Typically, functional clusters which operate at higher frequencies (as compared with functional clusters that operate at lower frequencies) require transistors which can handle higher currents, and also transistors which may have preferred configurations in other respects. For example, transistors configured to operate at relatively high frequencies may have a preferred ratio of gate width to gate length (that is, a preferred W/L ratio) or a preferred doping level. In turn, however, changing these design parameters for transistors (for example, the W/L ratio or doping level) or simply increasing the current through the transistor may result in greater leakage currents. Consequently, and consistent with the system and method described herein, it is desirable that functional clusters with their own associated frequency control logic 505 also have their own associated substrate bias voltage generator 405. In this way, a cluster-specific bias voltage Vsb can be applied to minimize the leakage current associated with the specific configuration of transistors in the cluster. (See for example FIG. 7.)

(g) Off-Chip Voltage Supplies and/or Off-Chip Frequency Control

In embodiments disclosed above (see for example FIGS. 2-8 and associated text), both chip-wide and cluster-specific voltage supplies have been illustrated as being on-chip, that is, as elements which are part of exemplary ICs 200, 600, 700, 800. In alternative embodiments, some or all voltage supplies may be off-chip, that is, regulated voltages may be supplied by voltage elements which are not part of IC 200, 600, 700, 800. Such voltages may be received via IC pins (not illustrated in figures above). In such embodiments, IC 200, 600, 700, 800 may still have on-chip voltage supply lines or power buses configured to convey voltages from IC pins to functional units 210 and functional clusters 215. IC 200, 600, 700, 800 may also have on-chip elements for routing externally supplied voltages to functional units 210 and functional clusters 215, and elements for configuring voltage routing on the IC.

In embodiments disclosed above (see for example FIGS. 5 and 8 and associated text), both chip-wide and cluster-specific oscillators 510 and frequency control logic 505 have been illustrated as being on-chip, that is, as elements which are part of exemplary ICs 200, 600, 700, 800. In alternative embodiments, some or all oscillators 510 and/or frequency control logic 505 may be off-chip, that is, clock signals and associated control logic may be supplied by oscillators and related elements which are not part of IC 200, 600, 700, 800. Such clock signals or other timing signals may be received via IC pins (not illustrated in figures above). In such embodiments, IC 200, 600, 700, 800 may still have on-chip clock buses configured to accept clock signals or other timing information from IC pins to functional units 210 and functional clusters 215. IC 200, 600, 700, 800 may also have on-chip elements for routing externally supplied clock/timing signals to functional units 210 and functional clusters 215, and elements for further configuring timing and/or operational frequencies on the IC.

(h) Combining Functional Clusters in Multiple ICs and/or Other Non-IC Functional Clusters.

In embodiments described above, functional clusters configured with components having a shared, critical voltage level and/or other common configuration parameters—that is, components of a common electrical property class—have been disclosed as all being functional clusters of a single integrated circuit. In alternative embodiments, multiple integrated circuits (that is, integrated circuits on completely separate dies or chips) may be configured with modules (functional clusters) of a common electrical property class. That is, a first chip (for example, a first IC) may have a functional cluster or clusters with components of only a given electrical property class (for example, electrical property class "X", which may for example be transistors with an SVt threshold voltage). A second IC may also have a functional cluster or clusters with components of only electrical property class "X" as well.

In this way, a common power supply, a common clock, a common bias voltage generator, or other shared supporting element(s) may be configured to power or support functional clusters distributed among two or more integrated circuits. The supporting elements(s) (power supply, clock, etc.) may be on the first IC and connected to the second IC, or may be on the second IC and connected to the first IC, or may be off-chip from both ICs and connected to both ICs. Persons skilled in the relevant arts will readily recognize that the same system and method may be extended to functional clusters of a common electrical property class or operational property class distributed among three or more ICs.

In alternative embodiments, circuits which are not part of integrated circuits, but rather are constructed from discrete components (for example, discrete transistors, resistors, capacitors, and other components on a printed circuit board (PCB)) may also be configured into functional clusters. As with the functional clusters on an IC, functional clusters comprised of discrete components are characterized by components of a common electrical property class or other property class. Each such cluster may again receive power from, or otherwise be driven by, supporting elements (a power supply, clock, bias voltage generator, etc.) configured specifically to support the discrete components of the common electrical class of the cluster.

In alternative embodiments, both functional clusters on one or more ICs and functional clusters comprised of discrete components may be part of a single electronic system or device. Functional clusters, whether on an IC or comprised of discrete components, which share components of a common electrical property class may be supported by a common power supply, clock, bias voltage generator, or similar driving or supporting elements.

(i) Redundant Functional Clusters

In embodiments disclosed above, it has been indicated that a first functional cluster (of two or more functional clusters) may have a same functionality, a similar functionality, or a different functionality of a second functional cluster of the two or more functional clusters. In some embodiments of the present system and method, two or more functional clusters may be specifically configured to provide a same function or substantially similar functionality, but with different performance parameters and with correspondingly different power requirements.

For example, a microprocessor may be configured with a first memory system (such as a cache memory) and a second memory system (such as a second level cache), but with the first cache memory configured for a higher speed of data storage and data retrieval than the second level cache memory. The higher speed memory will, typically, require higher power. The microprocessor may determine when a current application requires higher speed memory access, and employ the higher speed cache for that purpose. The microprocessor may also determine when a current application may meet its performance requirements with lower speed data access, and so may switch memory operations to the lower speed, lower power cache. A similar example may be a microprocessor configured with two (or more) redundant arithmetic units, the first configured for higher speed, higher power calculations, and the second configured for lower speed, lower power calculations. The appropriate arithmetic unit (higher speed or lower speed) may be called into play as application requirements demand or permit, respectively.

12. Conclusion

As will be appreciated by persons skilled in the relevant art(s), the system(s) and method(s) described here represent only one possible embodiment of the present invention. Many of the elements described herein could, in alternative embodiments of the present invention, be configured differently within the scope and spirit of the present invention. In addition, additional elements, or a different organization of the various elements, could still implement the overall effect and intent of the present system and method. Therefore, the scope of the present invention is not limited by the above disclosure and detailed embodiments described therein, but rather is determined by the scope of the appended claims.

What is claimed is:

1. An integrated circuit (IC) comprising:
   a plurality of functional clusters, each functional cluster including a plurality of electrical components belonging to the same electrical property class, each functional cluster having a respective critical voltage level; and
   one or more voltage supply elements, each configured to supply one or more respective functional clusters with a respective regulated voltage;
   wherein each respective functional cluster is capable of operating in more than one operational state and its current operational state is determined based on a level of the regulated voltage supplied to it and its critical voltage level.

2. The IC of claim 1, wherein the plurality of electrical components comprises a plurality of transistors.

3. The IC of claim 2, wherein the critical voltage level of a functional cluster corresponds to a threshold voltage of its associated transistors.

4. The IC of claim 3, wherein:
   the regulated voltage supplied to a functional cluster is equal to or greater than the threshold voltage of transistors within that functional cluster to cause an on-state of that functional cluster; and
   the regulated voltage supplied to a functional cluster is less than the threshold voltage of transistors within that functional cluster to cause an off-state of that functional cluster.

5. The IC of claim 2, wherein the critical voltage level of a functional cluster is a substrate bias voltage of the plurality of transistors associated with that cluster.

6. The IC of claim 5, wherein a power consumption of the substrate bias voltage of each functional cluster is set to a value that minimizes leakage currents.

7. The IC of claim 1, wherein at least a first respective critical voltage level of a first functional cluster is different from a second respective critical voltage level of a second functional cluster.

8. The IC of claim 1, wherein the operational state is at least one of an on-state, an on-state with a minimal power consumption, an off-state, or a frequency of operation of each respective functional cluster.

9. The IC of claim 8, wherein the on-state is determined by at least one of:
   the respective regulated voltage being equal to the respective critical voltage level; or
   the respective regulated voltage being greater than the respective critical voltage level.

10. The IC of claim 1, wherein the respective critical voltage level is a minimum voltage level required to maintain a selected operational frequency of the respective functional cluster.

11. The IC of claim 10, wherein the respective functional cluster is configured so that increasing the respective regulated voltage increases a maximum obtainable frequency of operation of the respective functional cluster.

12. The IC of claim 1, further comprising one or more frequency control elements, wherein one or more functional clusters of the plurality of functional clusters have one or more respective frequency control elements.

13. The IC of claim 12, wherein the IC is configured to reduce power consumption by the one or more functional clusters by using the respective one or more frequency control elements to reduce a respective frequency of operation of the one or more functional clusters.

14. The IC of claim 1, further comprising a control element configured to minimize a power consumption of the IC by at least one of:
  determining the regulated voltage supplied to the functional cluster; or
  determining a frequency of operation of the functional cluster.

15. The IC of claim 14, wherein the control element comprises control logic configured to dynamically minimize the power consumption of the IC in response to at least one of an operational requirement of the IC, an operational condition of the IC, or an operational environment of the IC.

16. The IC of claim 1, wherein a functional cluster comprises at least one of a general purpose processor, a microprocessor, a mathematical processor, an arithmetic/logic unit, a state machine, a digital signal processor, a video processor, an audio processor, a logic unit, a logic element, a multiplexer, a demultiplexer, a switching unit, a switching element, an input/output (I/O) element, a peripheral controller, a bus, a bus control, a register, a combinatorial logic element, a programmable logic device, a memory unit, a neural network, a sensing circuit, a control circuit, a digital to analog converter, a gate, a plurality of gates, an analog to digital converter, an oscillator, a memory, a filter, an amplifier, a mixer, a modulator, or a demodulator.

17. The IC of claim 1 wherein the plurality of functional clusters comprises a first functional cluster and a second functional cluster, and wherein:
  the second functional cluster is configured to provide a functionality which is at least partially redundant with a functionality of the first functional cluster, and
  the second functional cluster is configured to provide the redundant functionality at a lower power consumption than the first functional cluster.

18. The IC of claim 1, wherein a voltage supply element of the one or more voltage supply elements comprises an on-chip power supply.

19. The IC of claim 18, wherein at least two functional clusters of the plurality of functional clusters are configured to share a common on-chip power supply.

20. The IC of claim 1, wherein a voltage supply element of the one or more voltage supply elements comprises a bus for delivering voltage from an off-chip power supply.

21. The IC of claim 1, wherein at least two functional clusters of the plurality of functional clusters are supplied with respective regulated voltages from different respective voltage supply elements.

22. The IC of claim 1, wherein:
  a first respective functional cluster comprises a first threshold voltage transistors,
  a second respective functional comprises a second threshold voltage transistors, and
  a third respective functional cluster comprises a third threshold voltage transistors.

* * * * *

UNITED STATES PATENT AND TRADEMARK OFFICE
CERTIFICATE OF CORRECTION

PATENT NO. : 8,171,323 B2
APPLICATION NO. : 12/166065
DATED : May 1, 2012
INVENTOR(S) : Rakshani et al.

It is certified that error appears in the above-identified patent and that said Letters Patent is hereby corrected as shown below:

On the Title Page, Item (57), Abstract, replace "each functional modules" with --each functional module--.
Column 28, line 31, replace "transistors" with --transistor--.
Column 28, line 32, replace "functional comprises" with --functional cluster comprises--.
Column 28, line 33, replace "transistors" with --transistor--.
Column 28, line 35, replace "transistors" with --transistor--.

Signed and Sealed this
Nineteenth Day of June, 2012

David J. Kappos
*Director of the United States Patent and Trademark Office*